US012627956B2

(12) United States Patent
Hwang et al.

(10) Patent No.: US 12,627,956 B2
(45) Date of Patent: May 12, 2026

(54) METHOD FOR TERMINAL TO TRANSMIT FIRST SIGNAL AND DEVICE FOR SAME IN WIRELESS COMMUNICATION SYSTEM

(71) Applicant: LG ELECTRONICS INC., Seoul (KR)

(72) Inventors: Jaeho Hwang, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 314 days.

(21) Appl. No.: 18/272,314

(22) PCT Filed: Jan. 14, 2022

(86) PCT No.: PCT/KR2022/000755
§ 371 (c)(1),
(2) Date: Jul. 13, 2023

(87) PCT Pub. No.: WO2022/154588
PCT Pub. Date: Jul. 21, 2022

(65) Prior Publication Data
US 2024/0089713 A1      Mar. 14, 2024

(30) Foreign Application Priority Data
Jan. 14, 2021      (KR) ........................ 10-2021-0005398

(51) Int. Cl.
*H04W 4/40* (2018.01)
*G01H 3/04* (2006.01)
*G01H 3/10* (2006.01)
*H04W 4/90* (2018.01)
*H04W 24/02* (2009.01)

(52) U.S. Cl.
CPC ................ *H04W 4/40* (2018.02); *G01H 3/04* (2013.01); *G01H 3/10* (2013.01); *H04W 4/90* (2018.02); *H04W 24/02* (2013.01)

(58) Field of Classification Search
CPC ......... H04W 4/40; H04W 4/90; H04W 24/02; G01H 3/04; G01H 3/10
See application file for complete search history.

(56) References Cited

U.S. PATENT DOCUMENTS 10,755,691 B1      8/2020   Herman et al.
2017/0060130 A1*   3/2017   Kim ........................ H04W 4/80
(Continued)

FOREIGN PATENT DOCUMENTS

KR      10-2017-0025179 A      3/2017

*Primary Examiner* — Erika A Washington
(74) *Attorney, Agent, or Firm* — BRYAN CAVE LEIGHTON PAISNER LLP

(57) ABSTRACT

Disclosed are a method for a first vehicle to everything (V2X) terminal to transmit a first signal and a device for same in a wireless communication system according to various embodiments. The method comprises the steps of: receiving second signals from neighboring devices; and transmitting the first signal on the basis of the second signals, wherein the second signals are sound signals generated from the neighboring devices, and the first V2X terminal calculates a danger level on the basis of signal characteristics of the sound signals and determines the transmission interval of the first signal on the basis of the danger level.

13 Claims, 29 Drawing Sheets receiving second signals from neighboring devices — S201

Calculating a risk level based on a strength of the second signals that are sound signals — S203

Transmitting a first signal at a transmission period determined based on the risk level — S205

(56) References Cited

U.S. PATENT DOCUMENTS

| 2020/0118418 | A1 |  | 4/2020 | Benjamin |
|---|---|---|---|---|
| 2020/0294401 | A1 |  | 9/2020 | Kerecsen |
| 2020/0379108 | A1 |  | 12/2020 | Vijayalingam et al. |
| 2024/0062656 | A1 | * | 2/2024 | Forscher ............... G08G 1/163 |

* cited by examiner

PU5-U (a)

PU5-U (b)

BS (e.g. eNB or gNB)

Receiving a first signal from a first V2X UE     S301

Obtaining a risk level based on sound signals from the first signal     S303

METHOD FOR TERMINAL TO TRANSMIT FIRST SIGNAL AND DEVICE FOR SAME IN WIRELESS COMMUNICATION SYSTEM

This application is a continuation application of International Application No. PCT/KR2022/000755, filed on Jan. 14, 2022, which claims the benefit of Korean Patent Application No. 10-2021-0005398 filed on Jan. 14, 2021, the contents of which are all hereby incorporated by reference herein in their entirety.

TECHNICAL FIELD

The present disclosure relates to a method of transmitting a first signal by a vehicle-to-everything (V2X) user equipment (UE) in a wireless communication system and apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed.

The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

The present disclosure is to provide a method and apparatus for calculating quantified risk levels based on surrounding sound signals by quickly and analytically assessing the proximity of surrounding vehicles based on the sound signals and transmitting messages for vulnerable roadside user (VRU) safety with a transmission interval optimized for surrounding risk environments by determining a signal transmission interval based on the risk level It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

In an aspect of the present disclosure, there is provided a method of transmitting a first signal by a first vehicle-to-everything (V2X) user equipment (UE) in a wireless communication system. The method may include: receiving second signals from neighboring devices; and transmitting the first signal based on the second signals. The second signals may be sound signals generated by the neighboring devices. The first V2X UE may be configured to calculate a risk level based on signal characteristics of the sound signals and determine a transmission interval of the first signal based on the risk level.

Alternatively, the risk level may be calculated based on signal intensities among the signal characteristics, and the signal intensities may be determined based on signal intensities of the sound signals extracted for at least one predetermined frequency bandwidth.

Alternatively, the transmission interval may be determined based on a transmission interval configured for a first transmission mode related to the risk level among a plurality of transmission modes having different transmission and reception intervals, and a message type of the first signal may be determined based on a message type configured for the first transmission mode related to the risk level among the plurality of transmission modes.

Alternatively, an application sleep timing, a display brightness level, a location measurement scheme, and a black box operation mode of the first V2X UE may be determined based on the first transmission mode.

Alternatively, the first V2X UE may be further configured to: measure a Doppler frequency shift for each of the sound signals; and calculate an approach level based on the measured Doppler frequency shift. Based on that the approach level is more than or equal to a first predetermined threshold, the first transmission mode may be switched to a second transmission mode having a shorter transmission interval.

Alternatively, the second transmission mode may be a transmission mode having a shortest transmission and reception interval among the plurality of transmission modes.

Alternatively, detection of a sound signal having a positive Doppler frequency shift related to a blue shift may increase the Doppler level compared to detection of a sound signal having a negative Doppler frequency shift related to a red shift.

Alternatively, the first V2X UE may be further configured to: predict a sound signal direction of each of the sound signals based on a difference between arrival times at which each sound signal arrives at two or more sound signal receivers spaced apart at a predetermined distance; and calculate an emergency level based on the sound signal direction. Based on that the emergency level is more than or equal to a second predetermined threshold, the first transmission mode may be switched to a second transmission mode having a shorter transmission interval.

Alternatively, the second transmission mode may be a transmission mode having a shortest transmission and reception interval among the plurality of transmission modes.

Alternatively, the first V2X UE may be configured to predict directions of the sound signals among a first direction, a second direction, and a third direction. Detection of a sound signal predicted to be in the first direction corresponding to a traveling direction of the first V2X UE may increase the emergency level compared to detection of a sound signal predicted to be in the second or third direction.

Alternatively, the first V2X UE may be configured to aggregate an excess intensity for each direction, where the excess intensity is an extent to which a peak value of a signal intensity of each of the sound signals exceeds a predetermined threshold. The emergency level may be calculated by adding a product of excess intensities aggregated for the second direction and excess intensities aggregated for the third direction to excess intensities aggregated for the first direction.

In another aspect of the present disclosure, there is provided a method of receiving a first signal by a second V2X UE in a wireless communication system. The method may include: receiving the first signal from a first V2X UE; and obtaining a risk level for the first V2X UE based on the first signal. The second V2X UE may be configured to determine a reception interval of the first signal based on the risk level, and the risk level may be calculated based on signal characteristics of sound signals.

In another aspect of the present disclosure, there is provided a first V2X UE configured to transmit a first signal in a wireless communication system. The first V2X UE may include: a radio frequency (RF) transceiver; and a processor connected to the RF transceiver. The processor may be configured to: receive second signals generated by neighboring devices; calculate a risk level based on signal characteristics of sound signals; determine a transmission interval of the first signal based on the risk level; and control the RF transceiver to transmit the first signal based on the transmission interval.

In another aspect of the present disclosure, there is provided a second V2X UE configured to receive a first signal in a wireless communication system. The second V2X UE may include: an RF transceiver; and a processor connected to the RF transceiver. The processor may be configured to: control the RF transceiver to receive the first signal from a first V2X UE; obtain a risk level for the first V2X UE based on the first signal; and determine a reception interval of the first signal based on the risk level. The risk level may be calculated based on signal characteristics of sound signals.

In another aspect of the present disclosure, there is provided a chipset configured to transmit a first signal in a wireless communication system. The chipset may include: at least one processor; and at least one memory operably connected to the at least one processor and configured to, when executed, cause the at least one processor to perform operations. The operations may include: receiving second signals generated by neighboring devices; and calculating a risk level based on signal characteristics of sound signals; determining a transmission interval of the first signal based on the risk level; and transmitting the first signal based on the transmission interval through an RF transceiver.

In a further aspect of the present disclosure, there is provided a computer-readable storage medium including at least one computer program that performs operations for transmitting a first signal in a wireless communication system. The at least one computer program may be configured to cause at least one processor to perform the operations for transmitting the first signal, and the at least one computer program may be stored on the computer-readable storage medium. The operations may include: receiving second signals generated by neighboring devices; and calculating a risk level based on signal characteristics of sound signals; determining a transmission interval of the first signal based on the risk level; and transmitting the first signal based on the transmission interval through an RF transceiver.

According to various embodiments of the present disclosure, quantified risk levels may be calculated based on surrounding sound signals by quickly and analytically assessing the proximity of surrounding vehicles based on the sound signals. In addition, messages for vulnerable roadside user (VRU) safety may be transmitted with a transmission interval optimized for surrounding risk environments by determining a signal transmission interval based on the risk level.

Additionally, an emergency level may be calculated by estimating the relative positions and directions of the surrounding sound signals to a VRU device based on the difference in arrival times of the sound signals. Thus, it is possible to effectively cope with risks based on the sound signals by adjusting the transmission interval depending on the emergency level.

Additionally, an approach level related to the proximity of neighboring devices may be calculated by measuring a Doppler frequency shift for each of the surrounding sound signal. Thus, it is possible to effectively cope with risks based on the sound signals by further adjusting the transmission interval depending on the approach level.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

Figure 20:
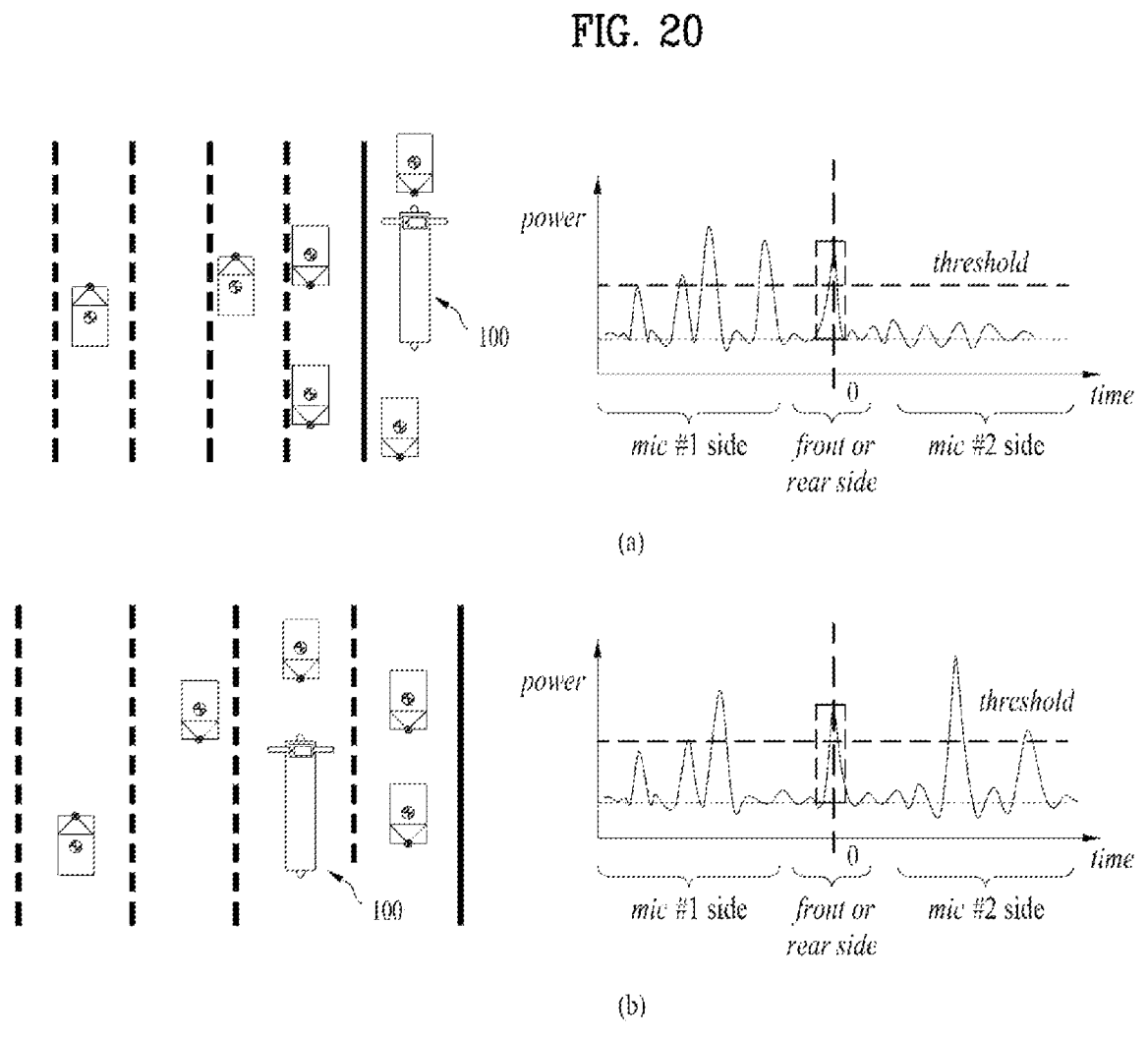

FIGS. 17, 18, 19, and 20 are diagrams for explaining a method for a VRU UE to calculate a risk level according to locations and directions measured based on sound signals.

DETAILED DESCRIPTION

Figure 1:
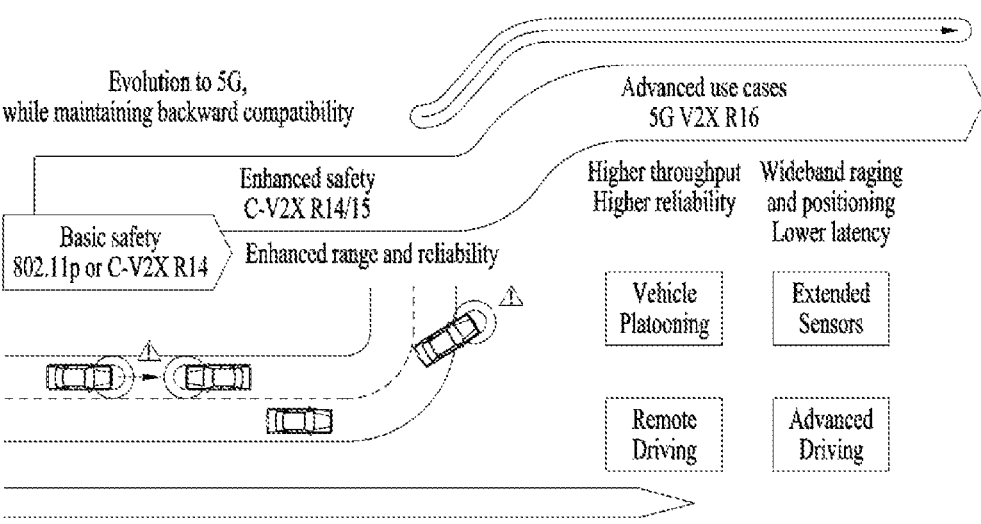
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/ LTE-A/LTE-A pro.

5G NR is a successor technology of LTE-A and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

Figure 2:
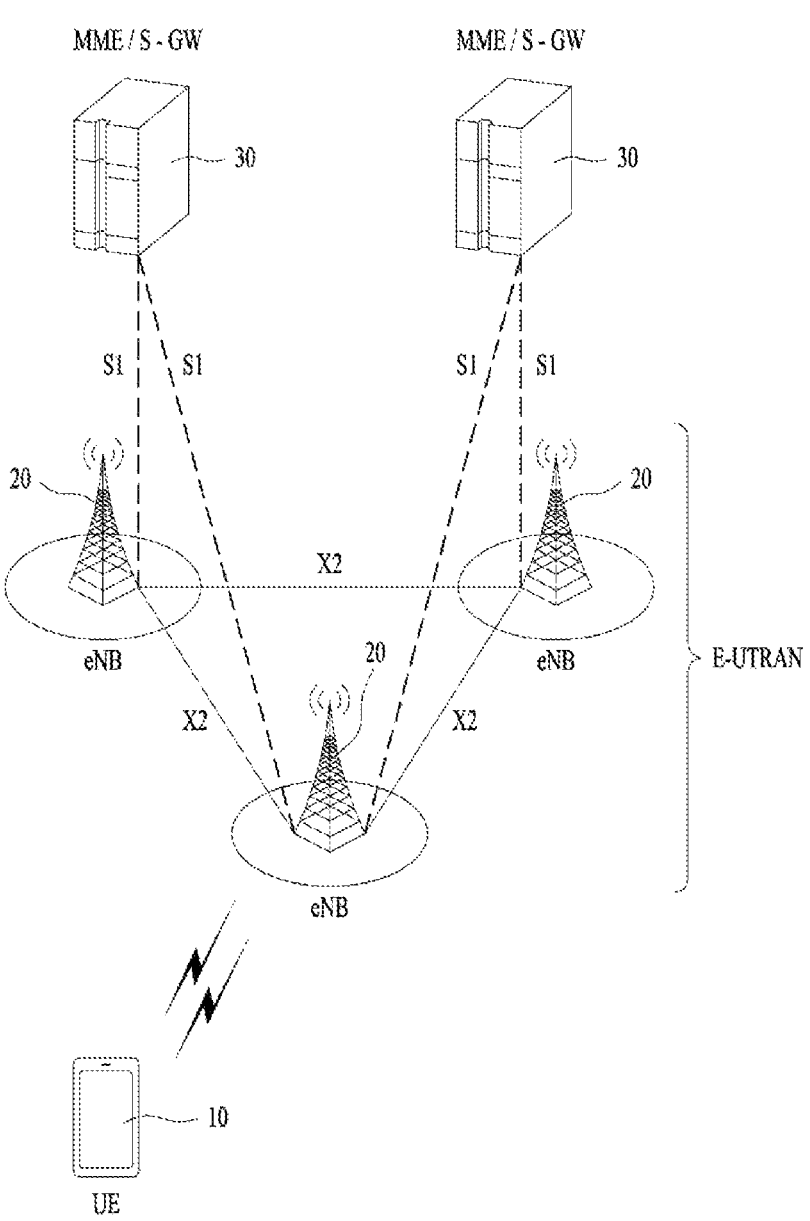
FIG. 2 illustrates the structure of an LTE system to which embodiment(s) are applicable.

FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
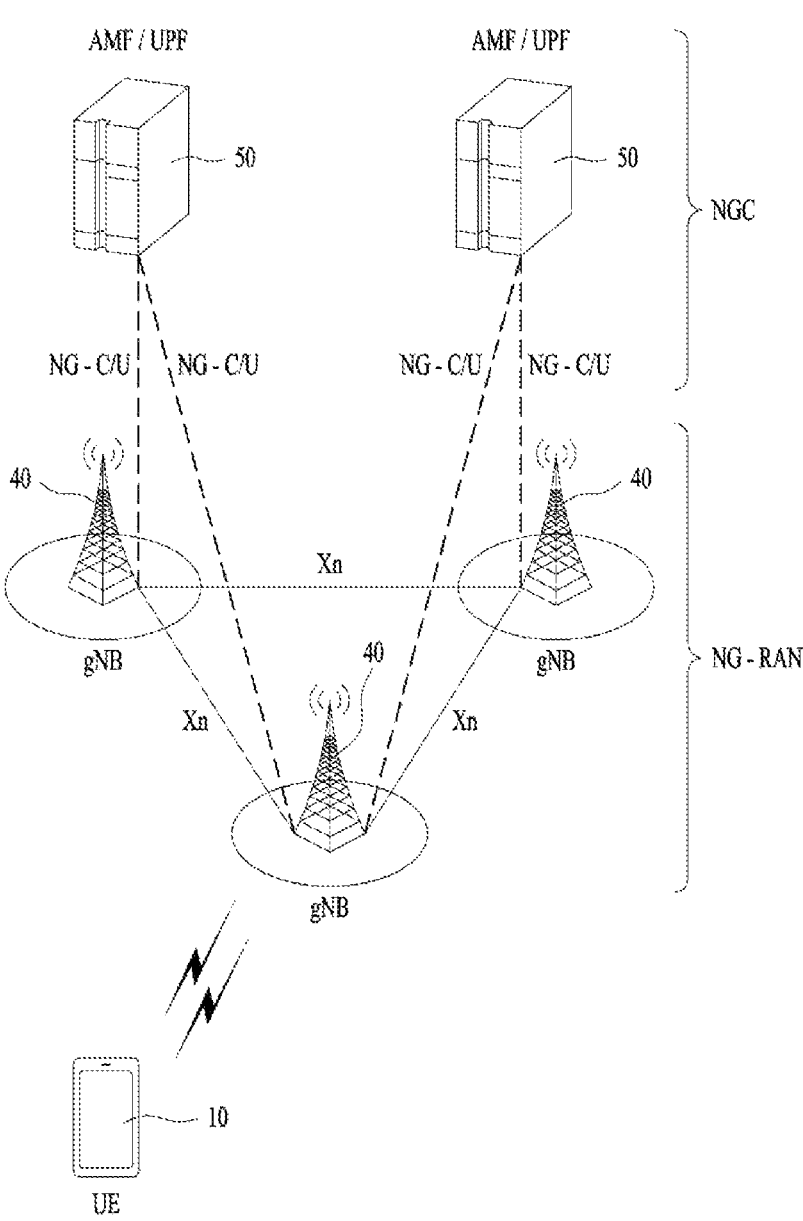
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
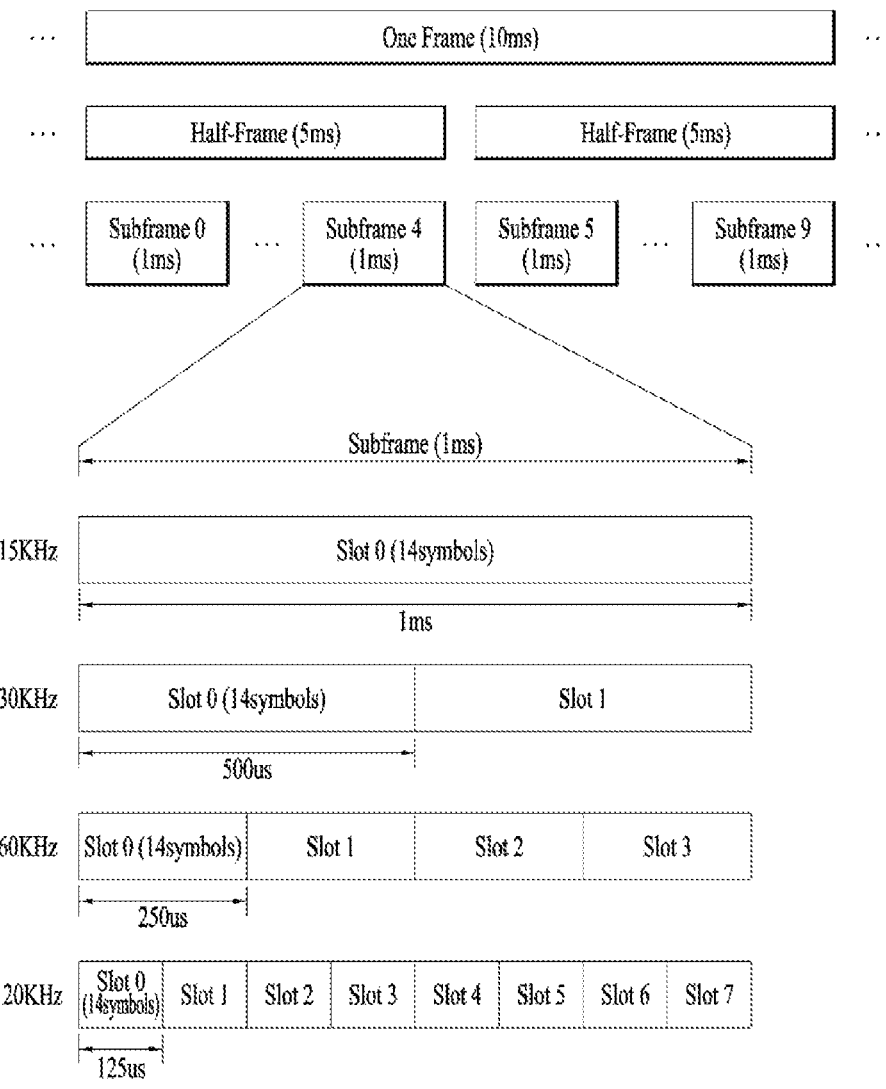
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration $\mu$ in the NCP case.

TABLE 1

| SCS (15*2 u) | $N^{slot}_{symb}$ | $N^{frame, u}_{slot}$ | $N^{subframe, u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | Nslotsymb | Nframe, uslot | Nsubframe, uslot |
|---|---|---|---|
| 60 kHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
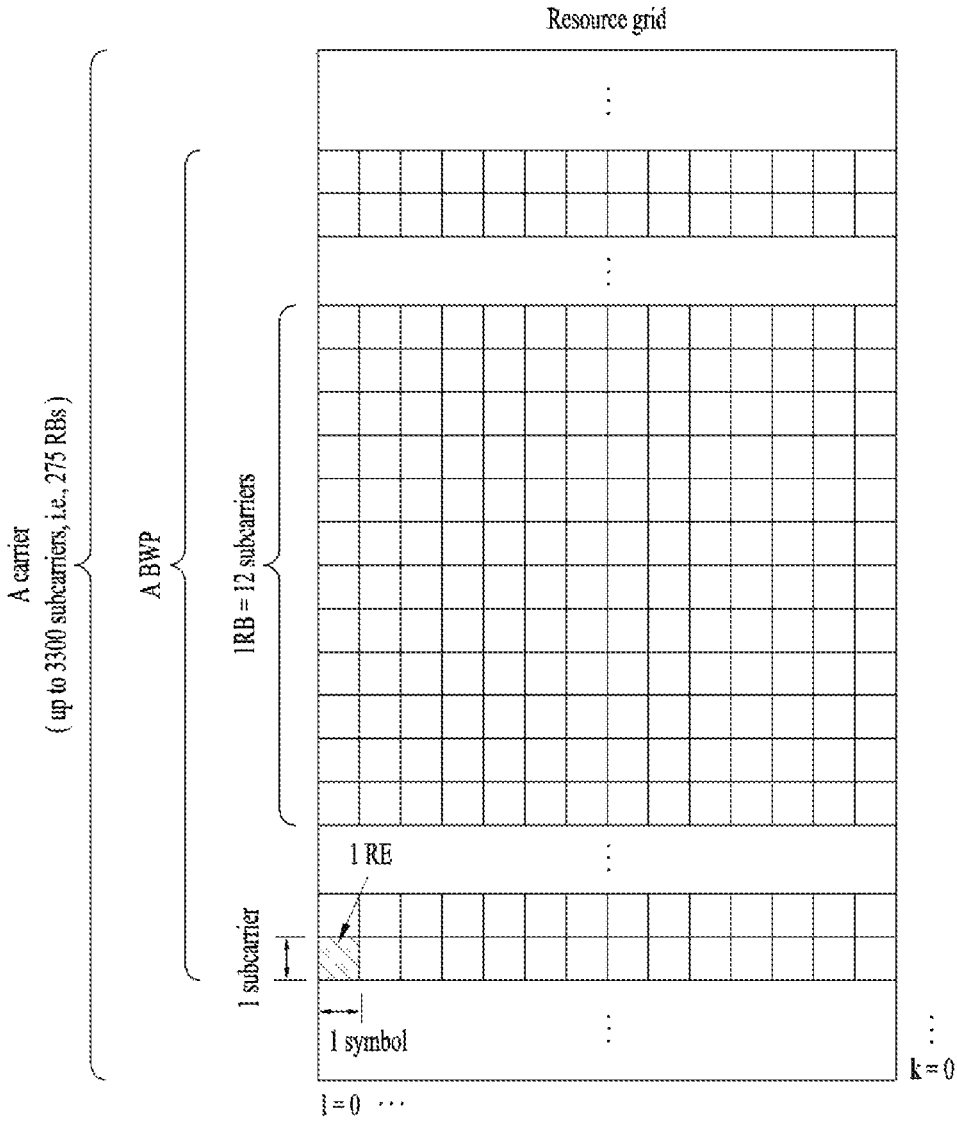
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
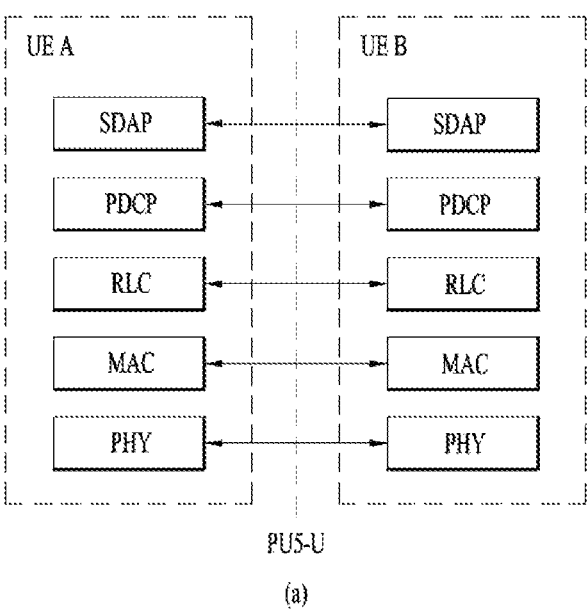
FIG. 6 illustrates a radio protocol architecture for SL communication.
Figure 6:
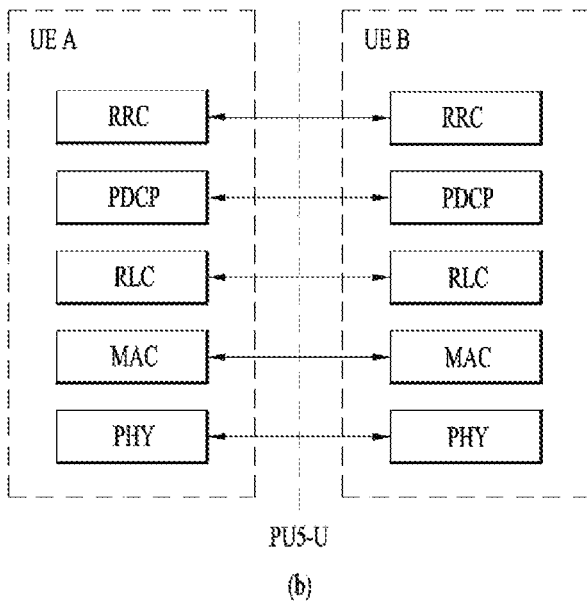

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
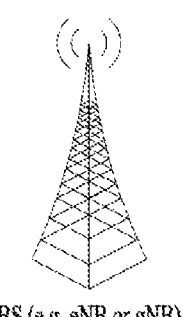
FIG. 7 illustrates UEs performing V2X or SL communication.
Figure 7:
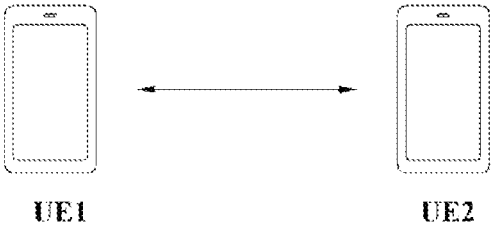

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
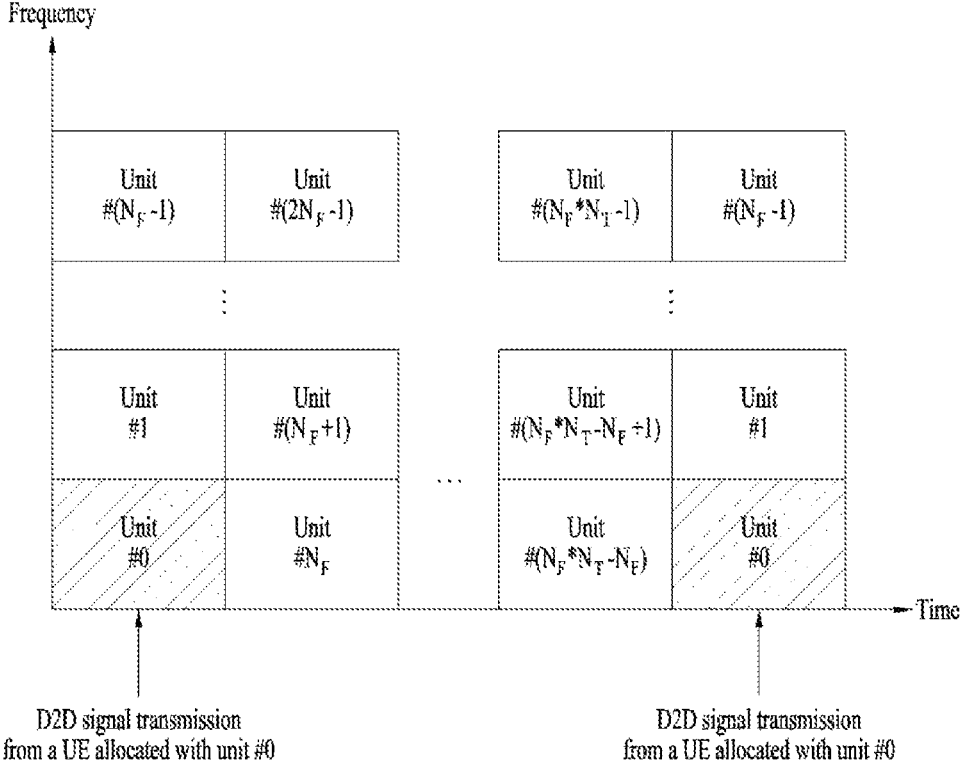
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 9:
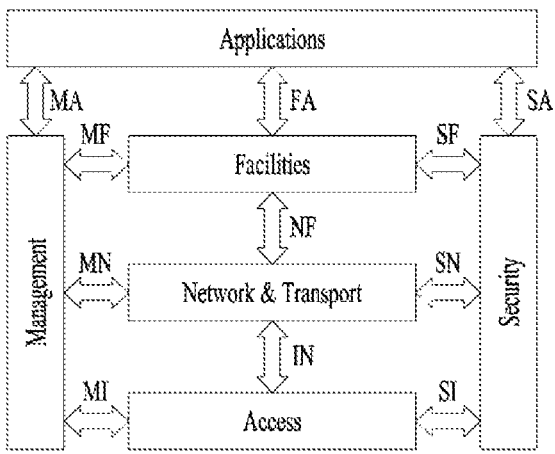
FIG. 9 is a diagram for explaining an ITS station reference architecture.

FIG. 9 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1

(physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

Figure 10:
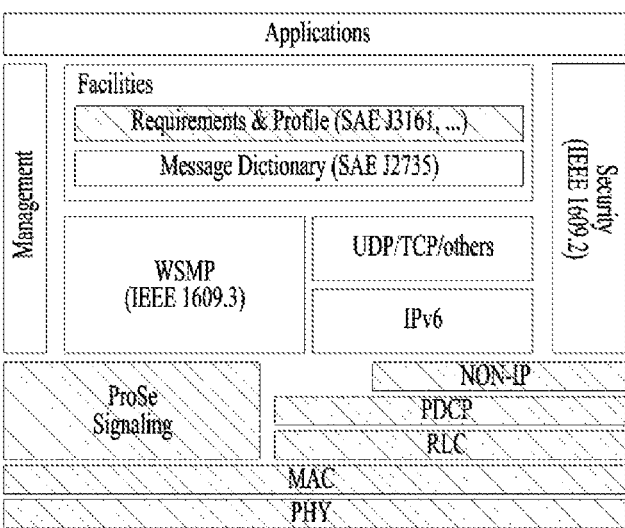
FIG. 10 illustrates an exemplary structure of an ITS station that may be designed and applied based on a reference architecture.

FIG. 10 illustrates an exemplary structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

Figure 11:
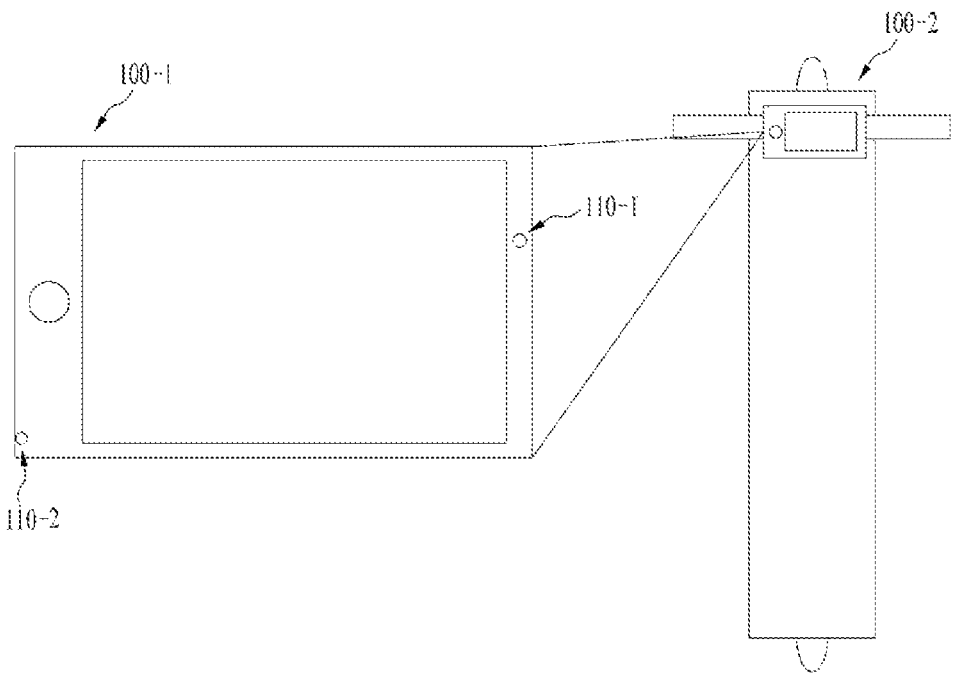
FIGS. 11 and 12 are diagrams for explaining a vulnerable roadside user (VRU) device that recognizes a surrounding environment and is fixed to a specific location.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

A Soft V2X system may be a system in which a Soft V2X server receives a VRU message or a personal safety message (PSM) from a vulnerable road user (VRU) or a V2X vehicle and transfers information on a neighbor VRU or vehicle based on the VRU message or the PSM message or may analyze a road condition, etc. on which neighbor VRUs or vehicles move and may transmit a message informing a neighbor VRU or vehicle of a collision warning, etc. based on the analyzed information (e.g., through a downlink signal) via V2X communication using a UU interface. Here, the VRU message may be a message transmitted to the Soft V2X server through the UU interface, and may include mobility information about the VRU, such as a position, a movement direction, a movement path, and a speed of the VRU. That is, the Soft V2X system may use a method of receiving mobility information of VRUs and/or vehicles related to V2X communication through the UU interface and controlling a driving route or a VRU movement flow of the VRU, etc. based on the mobility information received by the Soft V2X server, such as a network. The Soft V2X system may be configured in relation to V2N communication.

User equipment or pedestrian equipment (VRU device) that is difficult to perform direct communication (PC5, DSRC) related to V2X communication can provide or receive driving information and mobility information to nearby vehicles or VRUs through the Soft V2X system based on the UU interface. Through this, the user equipment or pedestrian equipment (VRU device) that is difficult to perform the direct communication (PC5, DSRC) can be protected from surrounding vehicles.
Efficient Soft V2X Transmission Technique Based on Sound Measurement of Surrounding Vehicles In the conventional V2X technology, messages are composed and operated based on broadcast-based short-range communication devices such as Dedicated Short Range Communication (DSRC) (or Cellular V2X (C-V2X)). In the conventional V2X technology, a vehicle may periodically broadcast a message to nearby vehicles or devices without a link, regardless of the state of the vehicle. In this case, the vehicle may transmit the message about its own state as much as possible in preparation for devices in the vicinity that do not know when to receive the message. Furthermore, methods of transmitting the message without considering battery consumption by installing on-board unit (OBU) devices into the vehicle are considered to maximize the potential applications of V2X.

However, there may be many V2X UEs that operate on the Uu interface with batteries (battery as the main power source). In this regard, there is a need for new devices and/or modifications to existing message operation methods that minimize battery consumption while enabling transmission of a message to inform the surrounding of one's own state. In other words, it is necessary to develop a device capable of perceiving optimized situations for the V2X UE that operate on the Uu interface with the battery and a method for optimal operations based thereon.

Hereinafter, methods in which the V2X UE transmits an optimized message depending on the surrounding ITS environment by recognizing the surrounding environment will be described in detail, which are different from existing methods in which the V2X UE periodically transmits a V2X message (or first signal). The V2X UE may include a V2X module and thus perform V2X communication.

The present disclosure will be described based on V2X UEs for ease of explanation. However, the present disclosure is applicable to any devices that perform short-range communication, such as vulnerable road user (VRU) devices or DSRC devices. That is, the present disclosure is not limited to the V2X UE. In addition, the V2X UE may correspond to a VRU device, a UE device, etc.

Figure 12:
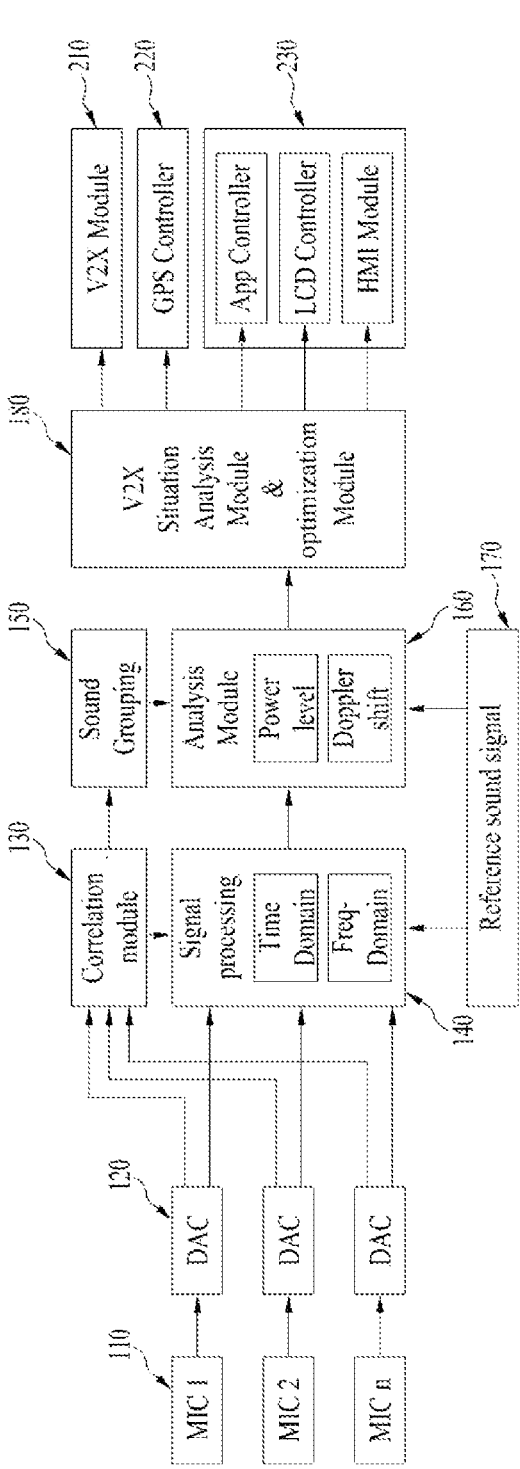

FIGS. 11 and 12 are diagrams for explaining a V2X UE that recognizes the surrounding environment and is fixed to a specific location.

Referring to FIG. 11, a V2X UE 100-1 may include devices such as smartphones capable of being attached to a specific fixed position on a kick scooter, bicycle, or wheelchair 100-2.

Specifically, the V2X UE 100-1 may be fixed to the handlebar of the kick scooter and include microphones 110-1 and 110-2 on the upper and lower parts thereof, respectively. In addition, the V2X UE 100-1 may transmit a V2X message (PSM, VRU awareness message (VAM), etc.) including its own state to neighboring devices through a V2X communication module (and/or Uu interface). The V2X UE 100-1 may analyze or extract vehicle sounds from surrounding noise or sound signals through the microphones 110-1 and 110-2 and use the extracted or analyzed vehicle sounds to efficiently operate the V2X UE or further enhance the safety of the user of the V2X UE.

In other words, the V2X UE 100-1 may analyze the noise or sound signals generated by surrounding vehicles, which are acquired from the microphones 110-1 and 110-2, to transmit optimized V2X messages (and/or Soft V2X signals).

Referring to FIG. 12, the V2X UE 100-1 may include a module for receiving sound signals through a microphone (MIC) module 110, a module for processing the received sound signals, and a module for analyzing the V2X environment and optimizing device parameters based on analyzed signals. In this case, the MIC module 110 may correspond to the microphones 110-1 and 110-2.

Specifically, the MIC module 110 may transmit the received electrical signal (i.e., noise or sound signals) to a digital-to-analog converter (DAC) 120, and the DAC 120 may convert or transform the received electrical signal into a digital signal.

A signal processing module 140 may perform signal processing on the surrounding sound signals, which are input from the MIC module 110 installed in the V2X UE 100-1. The signal processing module 140 may extract only sound signals generated by vehicles from the input sound signals, based on vehicle noise reference signals provided by a reference sound signal block 170.

Specifically, the signal processing module 140 may analyze the input sound signals in the time and frequency domains. The signal processing module 140 may remove ambient noise unrelated to the vehicles (e.g., voice signals) in both the time and frequency domains from the input sound signals. The signal processing module 140 may extract the sound signals generated by the vehicles based on vehicle noise data stored in the reference sound signal block 170. For example, the signal processing module 140 may modify the input sound signals in the frequency domain and then filter out other portions except for the frequency bands of the noise generated by the vehicles, thereby extracting the sound signals generated by the vehicles.

For example, the signal processing module 140 may extract only the sound signals generated by the vehicles using a predetermined frequency filter. The predetermined frequency filter may be a filter that allows the passage of sound frequencies in which vehicle sounds are experimentally observed. However, the predetermined frequency filter described above is merely one example, and the signal processing module 140 may extract the sound signals generated by the vehicles using various methods for extracting sound signals.

A correlation module 130 may analyze the difference in arrival times of sound signals received by microphones and determine locations where the sound signals are generated and/or the directions of the sound signals based on the distance between the microphones and the sources of the sound signals. In this case, a sound grouping module 150 may group the sound signals into several groups depending on the locations and/or directions of the sound signals.

An analysis module 160 may receive information on the determined directions and locations from the correlation module 130 and information on signal processing results obtained by the signal processing module 140 that analyzes the sound signals in the time and frequency domains. The analysis module 160 may analyze the intensities of the sound signals in the frequency and/or time domain based on the signal processing results and also analyze frequency characteristics generated due to the Doppler effects. Accordingly, the Soft V2X UE may recognize whether there are vehicles around and extract the relative states of the vehicles and Soft V2X UE.

An optimization module 180 may receive the analysis results from the analysis module 160 and perform operations for optimizing Soft V2X operation parameters (and/or V2X operation parameters) based on the analysis results. The parameters optimized by the optimization module 180 may be transferred to each module (V2X module, GPS module, application controller, liquid crystal display (LCD) controller, human-machine interface (HMI) module, etc.) to control the optimization of each device.

Figure 13:
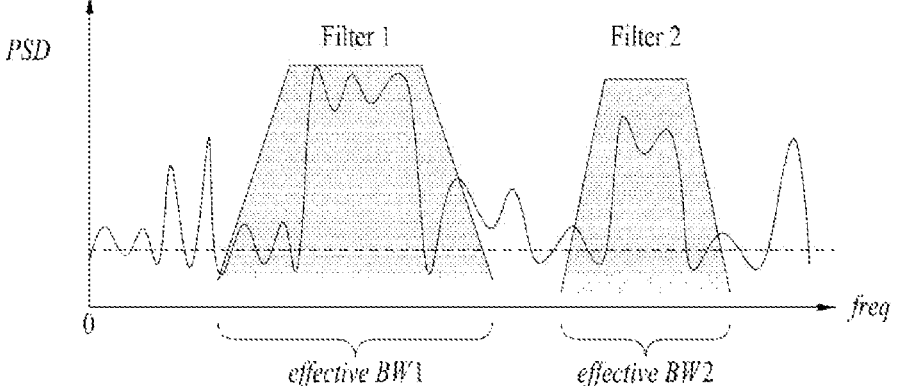
FIGS. 13 and 14 are diagrams for explaining a method for a signal processing module and an analysis module to process and analyze input sound signals according to an embodiment of the present disclosure.
Figure 14:
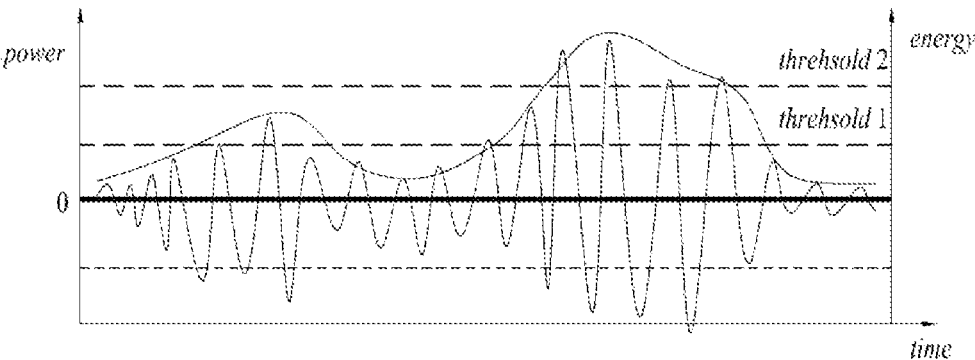
Figure 14:
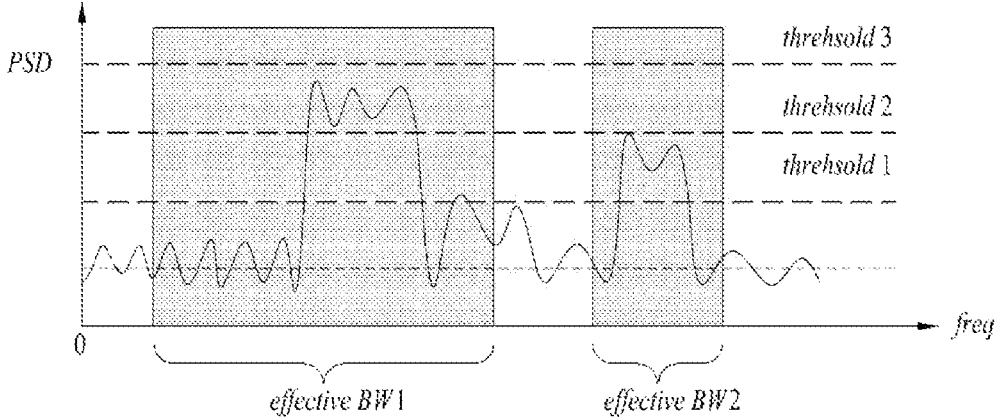

FIGS. 13 and 14 are diagrams for explaining a method for a signal processing module and an analysis module to process and analyze input sound signals according to an embodiment of the present disclosure.

Referring to FIG. 13, the signal processing module may remove sound signals outside a bandwidth (effective BW1) related to periodic noise generated by the vehicle's engine or wheels interacting with the ground and a bandwidth (effective BW2) related to the vehicle's horn sound and retain only the sound signals within the bandwidths. The signal processing module may remodify the sound signals in the time and frequency domains and transmit the sound signals to the analysis module.

Referring to FIG. 14, the analysis module may measure the energy levels of the sound signals in each of the time and frequency domains (through a power level comparison block). FIG. 14 schematically shows a method of measuring signals in the two domains. The analysis module may compare the energy of the sound signals in the time domain and then extract time-based normalized levels (or power levels) by comparing the energy levels with predetermined thresholds (e.g., threshold 1, 2, . . . , N) in a step-by-step manner. The analysis module may extract the power spectral density (PSD) for a specific frequency bandwidth in the frequency domain. The analysis module may compare the extracted PSD with predetermined thresholds (e.g., threshold 1, 2, . . . , N) and extract frequency-based normalized levels (or power levels).

Hereinafter, a method for a V2X UE to measure and analyze information on the locations and/or directions of sound signals based on the aforementioned modules will be described in detail.

Figure 15:
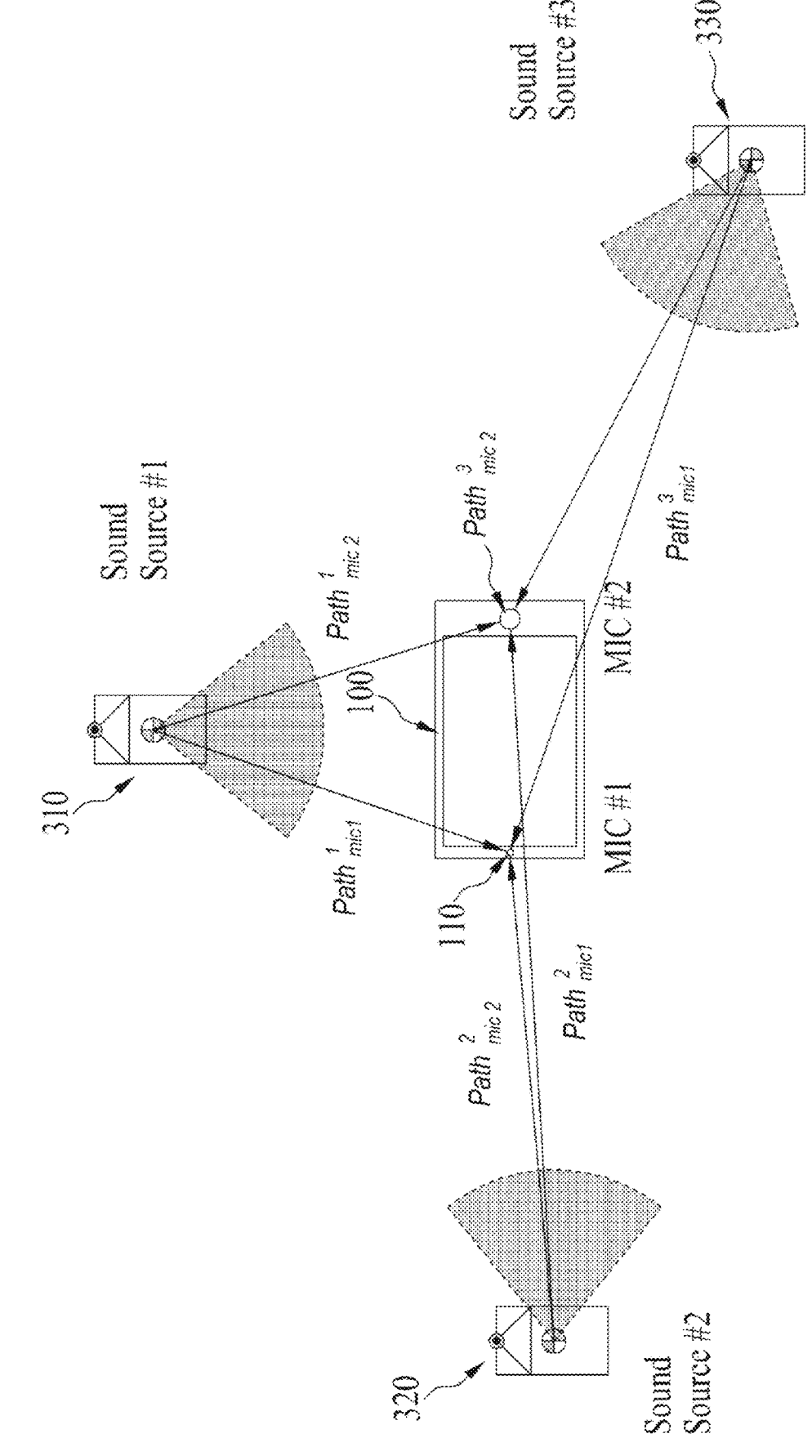
FIGS. 15 and 16 are diagrams for explaining a method for a VRU user equipment (UE) to measure the locations and directions of sound signals.
Figure 16:
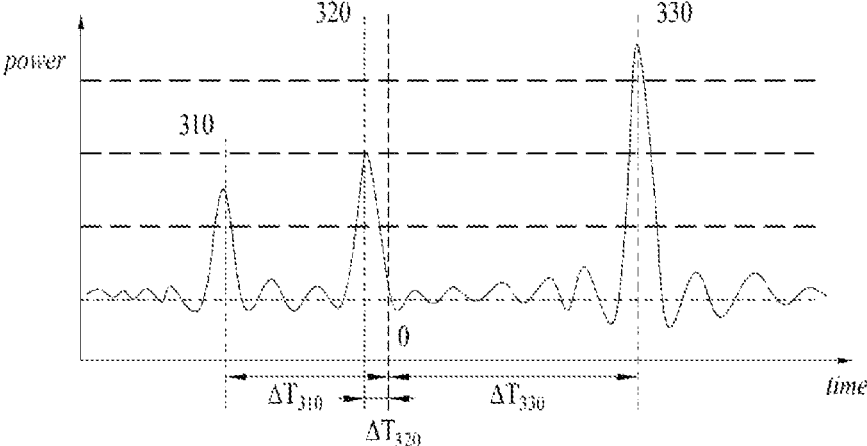

FIGS. 15 and 16 are diagrams for explaining a method for a V2X UE to measure the locations and directions of sound signals.

The V2X UE may determine the locations where the sound signals are generated and the relative distances between the locations and V2X UE based on the difference in arrival times of sound signals received by a plurality of microphones. In addition, the V2X UE may also determine the number of distributed sound sources based on the difference in arrival times.

Referring to FIG. 15, the V2X UE (or smartphone) may calculate the difference in arrival times of the sound signals through two microphones 110-1 and 110-2 included in the V2X UE. As described above, the V2X UE (or smartphone) may include microphones for voice calls and video calls, located at the top and bottom, respectively. The V2X UE (or smartphone) may measure the difference in arrival times of the sound signals received by the microphones. For example, a sound signal generated by a vehicle 310 such as sound source #1 310 located in front of the V2X UE is first received by the first microphone 110-1 and then received by the second microphone 110-2. A sound signal generated by sound source #3 330 located behind the V2X UE is first received by the second microphone 110-1. In contrast, a sound signal generated by sound source #2 320 located on the same line as the V2X UE (i.e., the side of the V2X UE) may be received by the first microphone 110-1 and the second microphone 110-2 at almost the same time.

The V2X UE may extract or measure the time difference of arrival, which is the difference between times at which a sound signal is received at the first microphone 110-1 and the second microphone 110-2, through convolution by a correlation module. Specifically, referring to FIG. 16, peak signals at specific positions may be detected by performing convolution on the sound signals received at the first microphone 110-1 and the second microphone 110-2. For example, referring to the peak point of the first sound signal generated by the first vehicle 310 located in front of the V2X UE, $\Delta T_{310}$ has a negative value. Referring to the peak point of the third sound signal generated by the third vehicle 330 located behind the V2X UE, $\Delta T_{330}$ has a positive value. On the other hand, referring to the peak point of the second sound signal generated by the second vehicle 320 located on the side of the V2X UE, $\Delta T_{320}$ has a value close to zero. Accordingly, the V2X UE may predict in which directions the first vehicle 310, the second vehicle 320, and the third vehicle 330 are located based on the values of $\Delta T_{310}$, $\Delta T_{320}$, and $\Delta T_{330}$.

FIGS. 17, 18, 19, and 20 are diagrams for explaining a method for a V2X UE to calculate a risk level according to locations and directions measured by the V2X UE based on sound signals.

Figure 17:
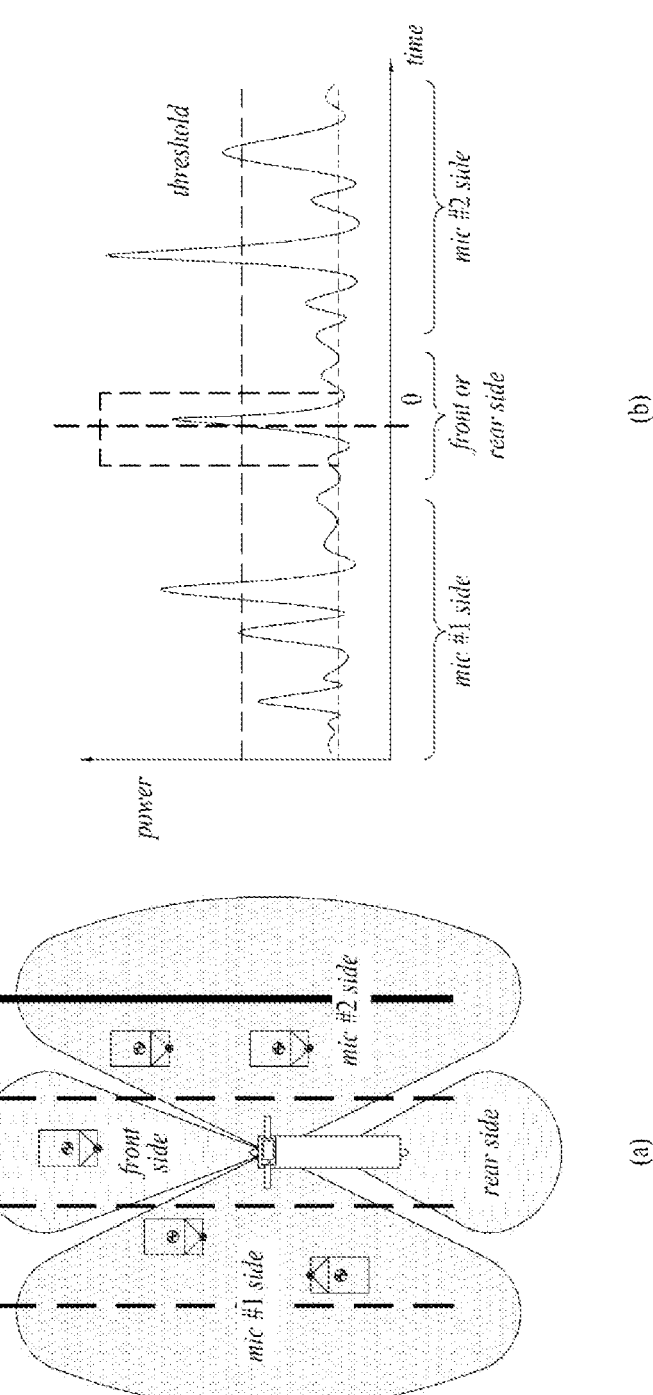

Referring to FIG. 17, the V2X UE may predict or estimate locations where peak points of sound signals occur, depending to locations around a kick scooter. The V2X UE may recognize the states of vehicles around the kick scooter based on the locations, which are estimated based on the peak points, and then perceive a risk level associated with the V2X UE based on the recognized states of the surrounding vehicles. If the time difference is determined to be close to zero based on the peak point of a sound signal, the V2X UE may predict that a vehicle generating the sound signal is located in front or rear of the V2X UE. In this case, the V2X UE may predict that there may be a potential risk posed by the vehicle and increase the risk level associated with the V2X UE.

On the other hand, if the estimated time difference based on the peak point of the sound signal is smaller than a prescribed negative value, the V2X UE may predict that the vehicle generating the sound signal is located towards microphone #1 (MIC #1) of the V2X UE. Alternatively, if the estimated time difference based on the peak point of the sound signal is equal to or greater than a prescribed positive value, the V2X UE may predict that the vehicle generating the sound signal is located towards microphone #2 (MIC #2) of the V2X UE. In this way, when it is determined that the vehicle is located on the left side (toward MIC #1) and/or right side (toward MIC #2) of the V2X UE, the V2X UE may predict that the risk level decreases compared to when the vehicle is located in the front or rear. Thus, the V2X UE may configure or determine a lower risk level than when the vehicle is located in the front or rear. Furthermore, when it is predicted that the vehicle is located only on either the left or right side of the V2X UE, the V2X UE may configure or determine a relatively lower risk level compared to when it is predicted that vehicles are located on both the left and right sides of the V2X UE.

Figure 18:
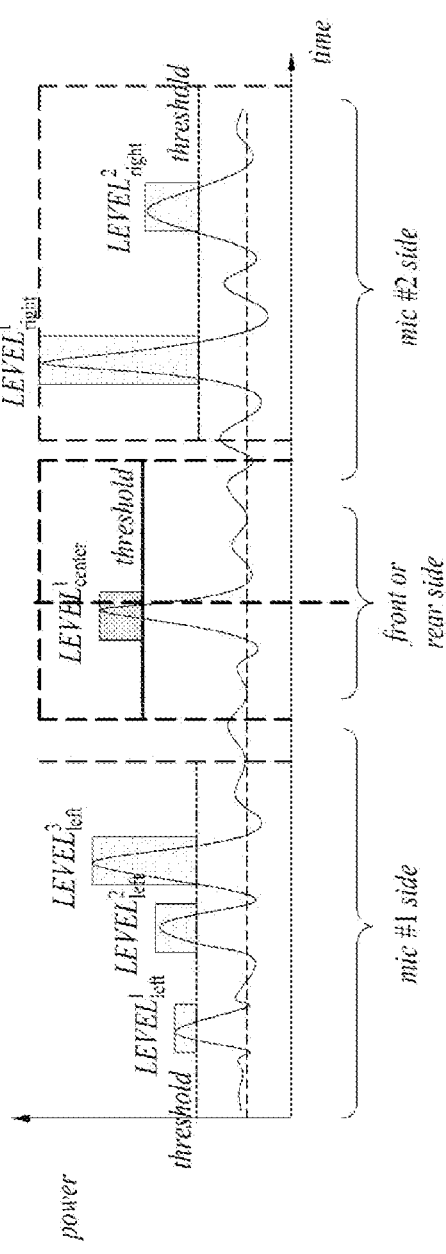

The V2X UE may calculate or determine an emergency level based on the energy of received signals. Specifically, referring to FIG. 18, signals may be divided into right, left, and center areas with respect to a point where the time difference is zero, and a threshold may be configured for each of the areas. Additionally, as shown in FIG. 18, a threshold configured for the center area may be higher (or lower) than thresholds configured for the left and right areas.

Specifically, the V2X UE may calculate the following: a first sum $$\left(\sum \text{LEVEL}_{right}^{i}\right)$$

of excesses $$\text{LEVEL}_{right}^{1}$$

and $$\text{LEVEL}_{right}^{2})$$

corresponding to how much the peak value of each sound signal in the right area exceeds the threshold (i.e., portions corresponding to how much each of the peak values exceed the threshold); a second sum $$\left(\sum \text{LEVEL}_{left}^{i}\right)$$

of excesses $$(\text{LEVEL}_{left}^{1}$$

$$\text{LEVEL}_{left}^{2},$$

and $$\text{LEVEL}_{left}^{3})$$

corresponding to how much the peak value of each sound signal in the left area exceeds the threshold; and a third sum $(\Sigma \text{LEVEL}_{lcenter}^{i})$ of excesses $(\text{LEVEL}_{center}^{1})$ corresponding to how much the peak value of each sound signal in the center area exceeds the threshold.

The V2X UE may calculate the emergency level based on the first sum, the second sum, and the third sum according to Equation 1 below. Referring to Equation 1, weights $(w_{center}, w_{left},$ and $w_{right}$ respectively corresponding to the first sum, second sum, and third sum may be applied. The weight may be adjusted or configured in consideration of the surrounding environment. In this case, the first and second sums (the values for the left and right areas) to which the weights are applied may be multiplied with each other and then added to the third sum (the value for the center area). On the other hand, when any one of the first and second sums is zero, values related to all sides may be zero due to the multiplication of the first and second sums.

$$\text{LEVEL}_{emergency}=w_{center}\times\Sigma\text{LEVEL}_{center}^{i}+ (w_{left}\Sigma\text{LEVEL}_{left}^{i})\times(w_{right}\Sigma\text{LEVEL}_{right}^{i}) \qquad \text{[Equation 1]}$$

Figure 19:
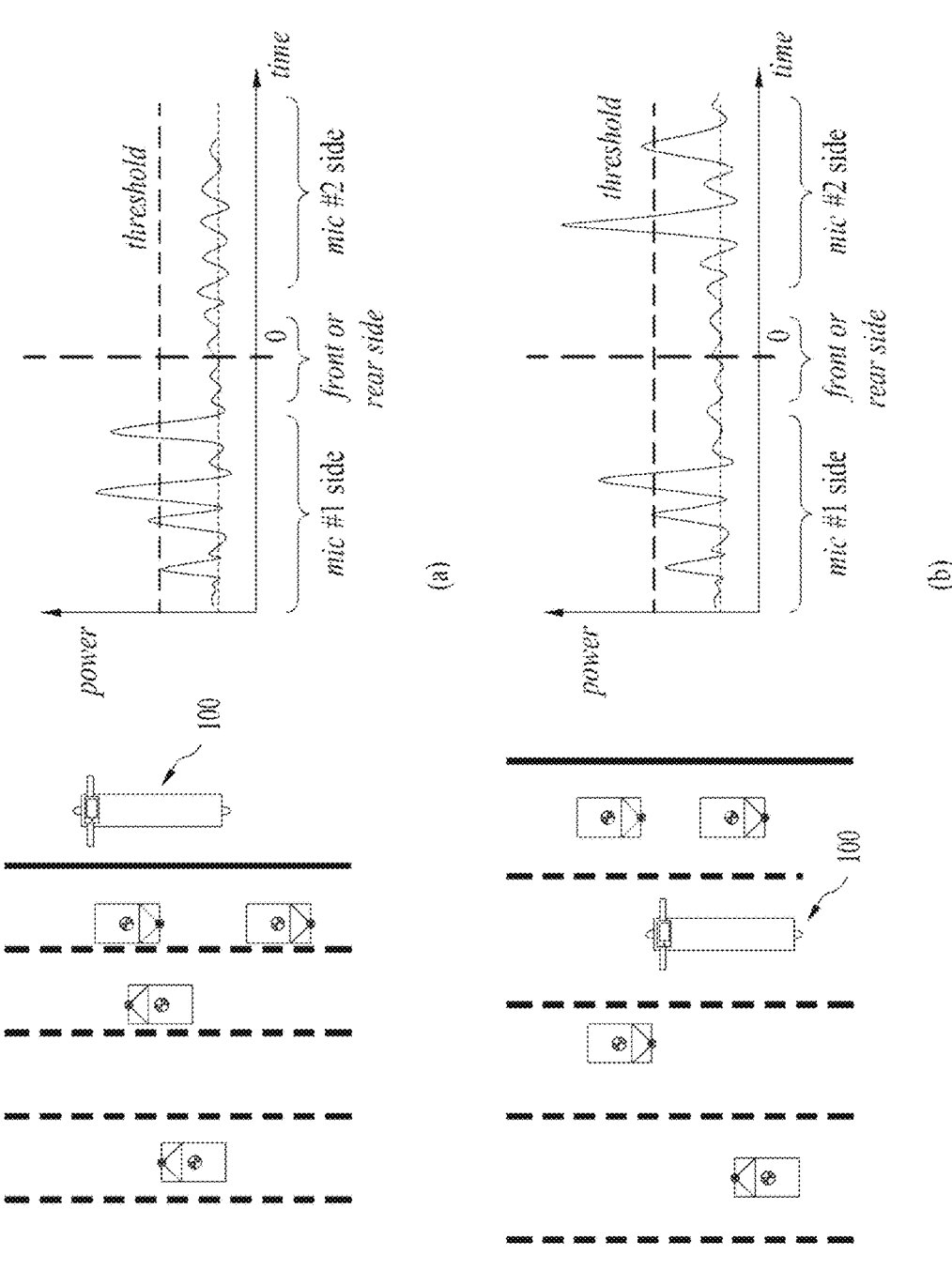

FIG. 19(*a*) shows a case in which there are vehicles on one side of the V2X UE (or the kick scooter where the V2X UE is attached). In this case, the V2X UE may predict that the vehicles are located on the left side based on the difference in arrival times of sound signals from surrounding vehicles. In addition, since the V2X UE detects no peak values exceeding the corresponding threshold on the right side, the first sum becomes zero. Thus, according to Equation 1, the emergency level becomes zero.

FIG. 19(*b*) shows a case in which there are vehicles on both sides (left and right) of the V2X UE (or the kick scooter where the V2X UE is attached). In this case, the V2X UE may predict that the vehicles are located on both the left and right sides based on the difference in arrival times of sound signals from surrounding vehicles. In addition, the V2X UE may calculate the emergency level based on the product of the first and second sums according to Equation 1.

FIG. 20(a) shows a case in which there are vehicles on the center side (i.e., in the travelling direction of the kick scooter) and on the left side of the V2X UE (or the kick scooter where the V2X UE is attached). In this case, the V2X UE may predict that the vehicles are located in both the center and right sides based on the difference in arrival times of sound signals from surrounding vehicles. In addition, the V2X UE may calculate the emergency level based only on the third sum (the sum calculated for the center side) because the product of the first and second sums becomes zero according to Equation 1.

FIG. 20(b) shows a case in which there are vehicles on all of the center side (i.e., in the travelling direction of the kick scooter), left side, and right side of the V2X UE (or the kick scooter where the V2X UE is attached). In this case, the V2X UE may predict that the vehicles are located on the center, right, and left sides based on the difference in arrival times of sound signals from surrounding vehicles. In addition, the V2X UE may calculate the emergency level by adding the third sum to the product of the first and second sums according to Equation 1. The calculated emergency level may be greater than the emergency levels calculated in the cases of FIG. 19(a), FIG. 19(b), and FIG. 20(a) (i.e., the emergency level calculated in FIG. 20(b) may have the highest value).

Hereinafter, a method for a V2X UE to additionally calculate the Doppler level by additionally considering the Doppler effect will be described in detail.

Figure 21:
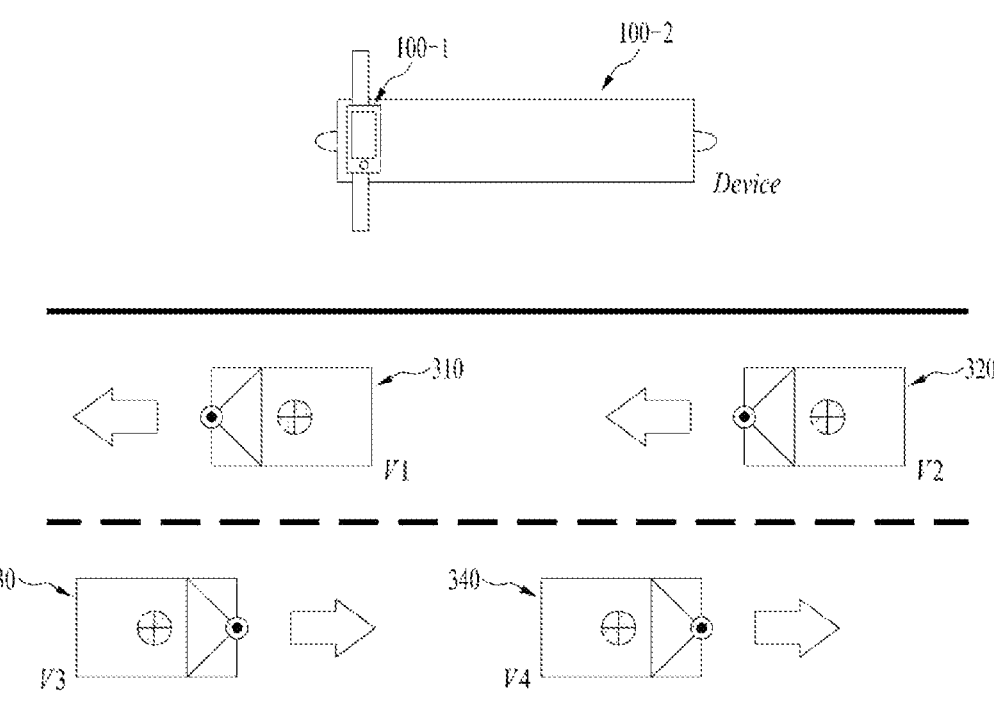
FIGS. 21, 22, and 23 are diagrams for explaining a method in which a VRU UE calculates a Doppler level by additionally considering the Doppler effect.
Figure 22:
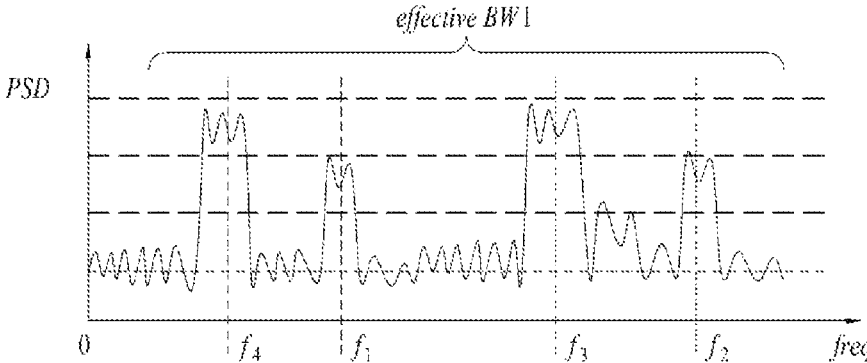
Figure 22:
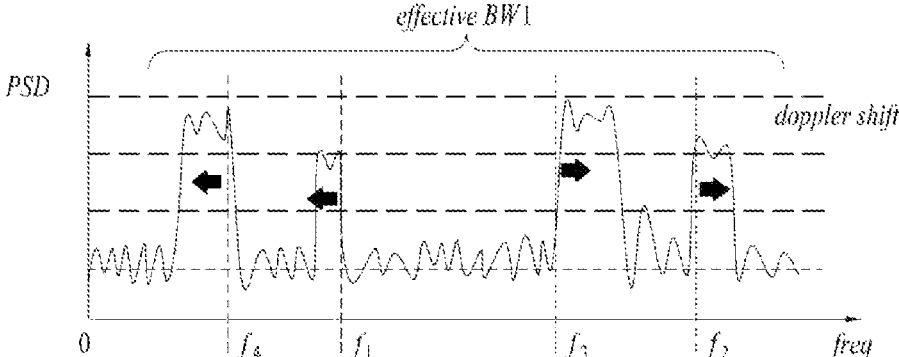
Figure 23:
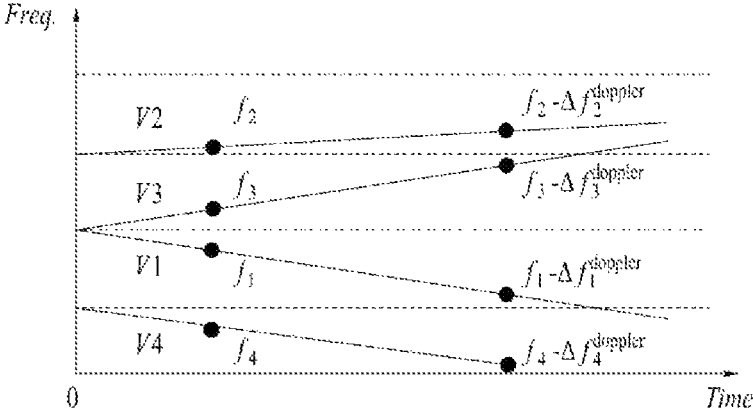

FIGS. 21, 22, and 23 are diagrams for explaining a method in which a V2X UE calculates a Doppler level by additionally considering the Doppler effect.

The V2X UE may perceive or calculate the Doppler level associated with the surrounding environment by additionally considering the Doppler effect in the frequency domain. For example, the center frequency value of the power (PSD) of sound signals generated by vehicles may be shifted due to the Doppler effect caused by the mobility difference between the vehicles and V2X UE.

Referring to FIG. 21, a moving object 100-2 having attached thereto a V2X UE 100-1 is traveling in the right direction. A first vehicle V1 310 is moving in the same direction as the moving object 100-2 at a higher speed than the moving object, and a fourth vehicle V4 340 is moving in the opposite direction to the first vehicle V1 310 and/or the moving object 100-2. In addition, the first vehicle V1 310 and the fourth vehicle V4 340 may gradually move away from the moving object 100-2. On the other hand, a second vehicle V2 320 is approaching the moving object 100-2 from behind at a high speed. A third vehicle V3 330 is moving in the opposite direction to the second vehicle V2 320 and getting closer to the moving object 100-2.

In this way, sound signals (or acoustic waves) generated by the vehicles may be subject to different Doppler effects based on the relative movement characteristics of the devices (vehicles). For example, a vehicle generating a sound signal having a positive Doppler shift frequency may be a vehicle approaching the moving object 100-2. In terms of the relationship with the moving object 100-2, this situation may indicate a higher level of risk (or an increase in the Doppler level). Alternatively, a vehicle generating a sound signal having a negative Doppler shift may be a vehicle moving away from the moving object 100-2. Thus, this situation may indicate a relatively lower level of risk (or a decrease in the Doppler level).

Referring to FIGS. 22(a) and 22(b), the center frequencies of vehicles (or devices) signals may vary within an effective frequency bandwidth (BW) measured at two different time intervals. Specifically, FIG. 22(a) illustrates the center frequencies of the sound signals at a first time, while FIG. 22(b) illustrates the center frequencies of the same sound signals at a second time after a lapse of a predetermined duration from the first time. In this case, the V2X UE may determine whether there is a vehicle dangerous to the V2X UE based on the direction in which the center frequency shifts from the first time to the second time. For example, a vehicle generating a Doppler-shifted sound signal in a direction in which the center frequency increases may be considered as a vehicle that may pose a danger to the V2X UE or a moving object. The V2X UE may determine whether there are potentially dangerous vehicles to the V2X UE, based on the direction in which the center frequencies shift from the first time to the second time. For example, the V2X UE may consider a vehicle that generates a sound signal with a Doppler shift in the direction of increasing the center frequency as a vehicle that may pose a risk to the V2X UE or moving object. For example, the V2X UE may consider vehicles that generate sound signals associated with f4 and f1 as non-hazardous vehicles. On the other hand, the V2X UE may consider vehicles that generate sound signals associated with f3 and f2 as hazardous vehicles.

FIG. 23 illustrates changes in the center frequencies (or Doppler frequency shifts) over time (or at each time interval). In other words, the changes in the center frequencies (or Doppler frequency shifts) of the sound signals over time (at each time interval) may be measured based on the relative mobility between the V2X UE and surrounding vehicles. In this case, the V2X UE may measure a frequency shift caused by the Doppler effect during a specific time interval. Based on the measured frequency shift, the V2X UE may determine or assess the number of devices (or vehicles) that may pose a risk to the V2X UE. For example, when a vehicle generating a low-intensity (or low-noise) sound signal approaches the V2X UE (i.e., when the measured frequency shift is positive), there may be a higher level of risk compared to when a vehicle generating a high-intensity (or high-noise) sound signal moves away from the V2X UE (i.e., when the measured frequency shift is negative). Thus, upon detecting approaching vehicles, the V2X UE needs to operate for the safety of its users. The V2X UE may configure the Doppler level based on the number of dangerous vehicles that transmit sound signals with positive frequency shifts. For example, if the number of dangerous vehicles is N, the V2X UE may set the Doppler level to N.

In this way, the V2X UE may analyze sound signals generated by surrounding vehicles using microphone(s). Based on the analyzed results, the V2X UE may discriminate the sound signals, assess the intensities of the sound signals (or noise levels), determine the locations of the devices (vehicles) generating the sound signals, and estimate the proximity to the devices (vehicles) based on the locations of the devices generating the sound signals. Based on the estimated information or values, the V2X UE may calculate or determine the emergency level and/or Doppler level. Then, the V2X UE may provide optimized V2X safety services based on the calculated or determined emergency level and/or Doppler level.

Hereinafter, operations of a V2X block 210, a GPS controller 220, and an APP (application) and LCD controller

230 shown in FIG. 12 will be described in detail in relation to a method of operating the V2X UE (or Soft V2X UE) depending on the power level (or normalized level), emergency level, and/or Doppler level, which are calculated based on sound signals from the surroundings.

Figure 24:
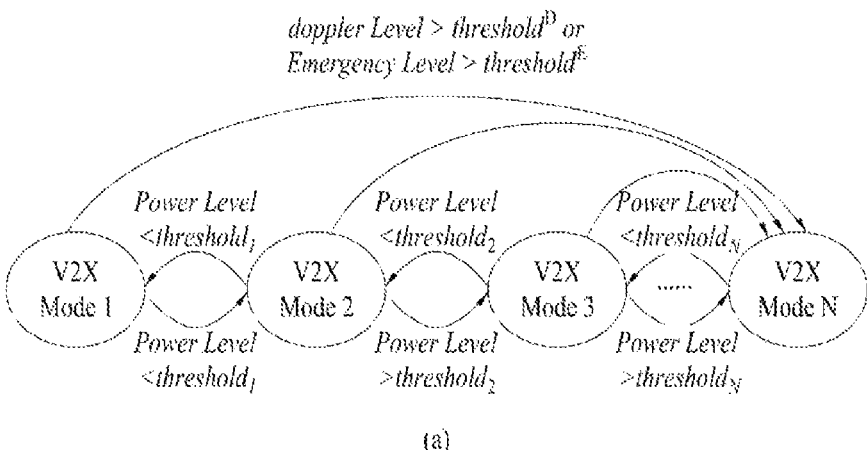
FIGS. 24 and 25 are diagrams for explaining a method for a VRU UE to configure a V2X mode based on a power level, an emergency level, and/or a Doppler level.
Figure 24:
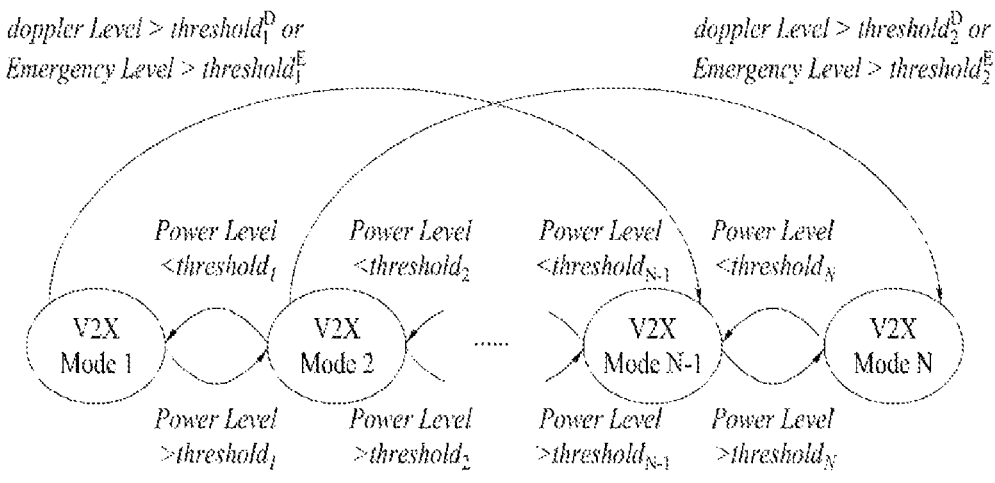
Figure 25:
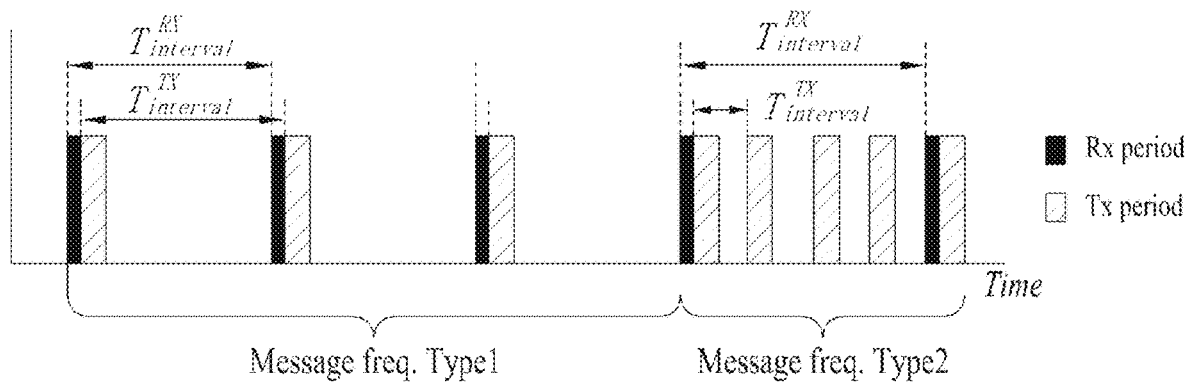

FIGS. 24 and 25 are diagrams for explaining a method for a V2X UE to configure a V2X mode based on a power level, an emergency level, and/or a Doppler level.

The V2X block included in the V2X UE may change the transmission method based on the state of the device (for example, emergency level and/or Doppler level), unlike the periodic transmission in conventional V2X.

Referring to FIG. 24(*a*), the V2X UE may calculate or determine a power level based on the intensities of sound signals from surrounding vehicles as described above with reference to FIGS. 13 to 15. Then, the V2X UE may compare the calculated power level with predetermined first thresholds (threshold$_1$, threshold$_2$, . . . threshold$_N$) and determine a related transmission or V2X mode among transmission or V2X modes (V2X mode 1, V2X mode 2, . . . , V2X mode N). A transmission/reception interval, power, GPS mode, and LCD mode may be preconfigured for each of the V2X modes or transmission modes.

Furthermore, the V2X UE may determine whether to switch to an emergency mode based on an emergency level, which is determined depending on the direction of a sound signal (sound wave direction), and a Doppler level (i.e., approach level), which is determined depending on the Doppler effect. Here, the emergency level and Doppler level are additionally estimated. In this case, the emergency mode may be V2X mode N, which is the highest level mode among the V2X modes. In FIG. 24(*a*), if the emergency level exceeds a second threshold (threshold$^E$) or if the Doppler level (i.e., approach level) reaches a third threshold (threshold)), the V2X UE may switch to the emergency mode, which is V2X mode N. In other words, if the Doppler level (i.e., approach level) or the emergency level exceeds a specific threshold, the V2X UE may switch the V2X mode to the highest level transmission mode (V2X Mode N). For the highest level transmission mode, the following may be configured: the shortest transmission interval, maximum transmission power, maximum LCD brightness, continuous operation of the safety service-providing application, and parameters for the most accurate location measurement, which are to provide the maximum safety with the user of the V2X UE.

Referring to FIG. 24(*b*), the V2X UE may raise the level of the current V2X mode to a specific level by comparing the emergency level with second thresholds (threshold$_1^E$, threshold$_2^E$, etc.) or comparing the Doppler level (i.e., approach level) with third thresholds (threshold$_1^D$, threshold$_2^D$, etc.). For example, when the emergency level exceeds threshold 2-1 (threshold$_1^E$), the current V2X mode may be switched to V2X mode N-1. When the emergency level exceeds threshold 2-2 (threshold$_2^E$), the current V2X mode may be switched to V2X mode N. In this case, the V2X UE may control the V2X mode precisely based on the emergency level and the Doppler level.

Referring to FIG. 25, the transmission interval of messages may be adjusted for each V2X mode. In a stationary mode or V2X Mode 1, messages may be transmitted according to the predetermined maximum transmission interval (message frequency type 1). For example, the transmission interval may be determined based on the value of $$T_{interval}^{TX},$$

and the reception interval may be determined based on the value of $$T_{interval}^{RX}.$$

When the V2X UE increases the level of the V2X mode level based on the power level and the like, the transmission and reception intervals of messages may become shorter. This allows for the transmission and reception of more messages or data, thereby enhancing the user's safety of the V2X UE. In other words, when the V2X mode level increases, parameters for short transmission intervals may be configured (or the transmission and reception intervals may be adjusted based on predetermined parameters for each mode). For example, referring to FIG. 25, for the V2X transmission level corresponding to a second message transmission type (message frequency type 2), the V2X UE may maintain the same reception interval as a first message transmission type (message frequency type 1) but reduce the transmission interval by ¼.

The transmission and reception intervals may be defined for each V2X mode as shown in Table 5. In other words, the transmission and reception intervals $$(T_{interval}^{TX}$$

and $$T_{interval}^{RX})$$

may be preconfigured for each V2X mode. The transmission and reception intervals are merely an example, and thus the intervals may be optimized according to the system and surrounding conditions. In addition, transmission parameters (transmission power, retransmission count, transmission resources, etc.) may be preconfigured for each V2X mode. In this case, the V2X UE (or device) may use the transmission parameters related to the determined V2X mode to transmit signals or messages. Additionally, message types and/or message field configurations may be preconfigured for each V2X mode. While adjusting the transmission interval is described as an example, the present disclosure is not limited thereto. It is also possible to adjust transmission parameters related to the physical (PHY) layer or employ additional message operation methods, such as adding message fields for the user safety, based on the V2X mode or transmission mode.

TABLE 5

| Message Type (or transmission mode) | $T_{interval}^{TX}$ | $T_{interval}^{RX})$ |
| --- | --- | --- |
| V2X mode 1 (or transmission mode 1) | 1000 ms | 1000 ms |
| V2X mode 2 (or transmission mode 2) | 500 ms | 500 ms |
| V2X mode 3 | 100 ms | 500 ms |

TABLE 5-continued

| Message Type (or transmission mode) | $T_{interval}^{TX}$ | $T_{interval}^{RX})$ |
|---|---|---|
| (or transmission mode 3) V2X mode 4 (or transmission mode 4) | 100 ms | 100 ms |
| . . . V2X mode N (or transmission mode N) | . . . 20 ms | . . . 20 ms |

Table 6 shows that the sleep periods of an application, LCD operation modes, and black box operation modes (e.g., control of black box related applications and/or activation of emergency calls) preconfigured for each V2X mode. When the emergency level, Doppler level, and/or power level is low (e.g., when there are fewer surrounding vehicles) and/or when the accident probability (risk) for the user of the V2X UE is low and the user's response is feasible, the V2X UE may configure V2X mode 1. Specifically, the V2X UE may set the sleep period to the maximum value (e.g., one second), and turn off the LDC, and turn off other installed safety applications as well. As the V2X mode level increases (or the state increases), the sleep period gradually decreases, the operating time and brightness of the LCD gradually increase, and the level of the safety application also increases. Alternatively, when there is an event (when the emergency level exceeds the second threshold or the Doppler level exceeds the third threshold), the V2X UE may maximize the configuration of the device (V2X UE) to enable the user to cope with the risk. Specifically, the V2X UE may turn off the sleep mode of the application (keep the application running at all times), keep the LCD on at maximum brightness, operate the black box application at maximum performance, and activate an emergency call (E-Call) to provide the user with as much safety-related information as possible. The values presented in Table 6 are provided as an example, and the values may be optimized depending on the system and surrounding conditions in implementation.

TABLE 6

| Message Type (or transmission mode) | Sleep time | LCD level | App control |
|---|---|---|---|
| V2X mode 1 (or transmission mode 1) | 1 s | Off | Black box off, E-Call off |
| V2X mode 2 (or transmission mode 2) | 500 ms | Off | Black box On (level1), E-Call off |
| V2X mode 3 (or transmission mode 3) | 100 ms | LCD bright level 1 | Black box On (level2), E-Call off |
| V2X mode 4 (or transmission mode 4) | 100 ms | LCD bright level 2 | Black box On (level3), E-Call off |
| . . . V2X mode N (or transmission mode N) | . . . Always on | . . . Always on (setting Max) | Black box On (levelMax), E-Call On |

Alternatively, the location measurement scheme may vary depending on the V2X mode or transmission mode. For example, as the level of the V2X mode or transmission mode increases, at least one location measurement scheme with higher precision may be preconfigured. These location measurement scheme may include a power saving scheme that turns off all location measurement devices, a location measurement scheme based on an inertial measurement unit (IMU), a location measurement scheme based on a global positioning system (GPS), a location measurement scheme based on a differential global positioning system (DGPS), a location measurement scheme based on real time kinematics (RTK), and a location measurement scheme based on wireless communication.

Figure 26:
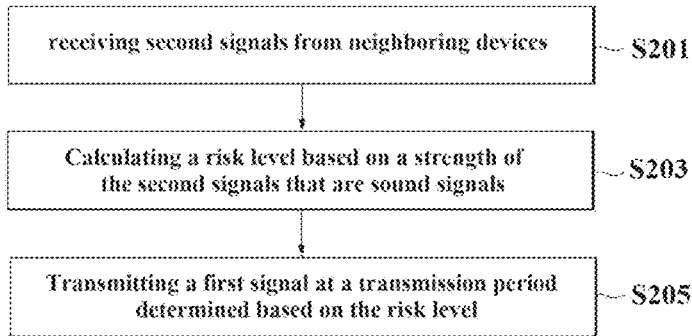
FIG. 26 is a diagram for explaining a method for a first VRU UE to transmit a first signal.

FIG. 26 is a diagram for explaining a method for a first V2X UE to transmit a first signal.

Referring to FIG. 26, the first V2X UE may receive second signals from neighboring devices (S201). As described above, the second signals may be noise or sound signals generated by the neighboring devices as described in FIGS. 11 to 25. Alternatively, the second signals may be sound signals extracted for a predetermined frequency bandwidth among the noise or sound signals generated by the neighboring devices. In this case, the predetermined frequency bandwidth may be determined based on the frequency range of sounds generated by the vehicles.

For convenience of description, the second signals are assumed to be sound signals.

The first V2X UE may calculate a risk level based on the signal characteristics of the sound signals. The signal characteristics may include a signal intensity (sound volume), a Doppler frequency shift, a difference in arrival time, and the like.

Specifically, the first V2X UE may calculate the risk level based on signal intensities (or sound volume), which is one of the characteristics of the sound signals. The first V2X UE may compare the signal intensity with specific thresholds to calculate the risk level as described above with reference to FIGS. 13 and 14. For example, when the specific thresholds include first threshold(s), second threshold(s), and third threshold(s), if the signal intensity is more than or equal to the first threshold and less than the second threshold, a risk level of 1 may be calculated. If the signal intensity is more than or equal to the second threshold and less than the third threshold, a risk level of 2 may be calculated. If the signal intensity is more than or equal to the third threshold value, a risk level of 3 may be calculated. In other words, a higher signal intensity (or sound volume) in the surrounding environment indicates that there are more vehicles in the vicinity.

Therefore, the first V2X UE may calculate a higher risk level when the signal intensity in the surrounding environment increases.

Alternatively, the first V2X UE may calculate or determine an approach level (or Doppler level) related to the risk level by considering a Doppler frequency shift caused by the Doppler effect among the signal characteristics of the sound signals. Specifically, the first V2X UE may measure or calculate the degree of deviation of the center frequency per time unit, which is caused by the Doppler effect, for each sound signal (the degree of deviation is referred to as the Doppler frequency shift). The first V2X UE may determine an emergency level based on the Doppler frequency shift for each sound signal. For example, the V2X UE may measure or calculate whether a blue shift (indicating that the Doppler frequency shift is more than 0) or a red shift (indicating that the Doppler frequency shift is less than 0) is detected for each sound signal. Specifically, as described above in FIGS. 21 to 23, when the Doppler frequency shift is positive, the V2X UE may perceive the presence of vehicles approaching to the V2X UE and then recognize a potential hazardous situation. Accordingly, the V2X UE may calculate or configure the Doppler level (or approach level) based on the number of sound signals with positive Doppler frequency shifts. For example, if there are N sound signals with positive Doppler frequency shifts, the Doppler level may be set or determined as N. Since the Doppler effect varies depending on the proximity of the neighboring devices, the Doppler level may correspond to the approach level.

Alternatively, the V2X UE may also calculate or determine the emergency level (or direction level) by considering the difference in arrival times between two or more sound receivers spaced apart based on the propagation speeds of the sound signals among the signal characteristics of the sound signals.

Specifically, the V2X UE may include two or more receivers (which are spaced apart at a predetermined distance) for receiving the sound signals. As described above in FIGS. 15 to 20, the V2X UE calculates the difference in arrival times, which is the difference between times at which each sound signal arrives at the two or more receivers. Based on the difference in arrival times, the V2X UE may predict the locations and/or directions from which the sound signals originate (such a direction is referred to as a sound signal direction). The V2X UE may calculate the emergency level based the predicted directions of the sound signals. In other words, the emergency level may represent the anticipated level of risk associated with the directions of the sound signals.

For example, when a first microphone and a second microphone are positioned to the left and right in the travelling direction of the V2X UE, respectively, if a sound signal is received first by the first microphone, the V2X UE may predict that the direction of the sound signal is to the left (or a second direction). If a sound signal is received first by the second microphone, the V2X UE may predict that the direction of the sound signal is to the right (or a third direction). If a sound signal is received almost simultaneously by the first and second microphones (or the absolute value of the difference in arrival times is less than a predetermined threshold), the V2X UE may predict that the direction of the sound signal is either the travelling direction of the V2X UE or the opposite direction thereto (or a first direction). In this case, if the first V2X UE detects a sound signal that originates from the travelling direction of the first V2X UE or the opposite direction, the first V2X UE may determine that there is a device or vehicle with a high risk of collision with the first V2X UE. When the V2X UE detects a sound signal in the first direction, the V2X UE may calculate or configure a higher emergency level, compared to when the V2X UE detects a sound signal in the second or third direction. Alternatively, when the V2X UE detects sound signals in the second and third directions, the V2X UE may calculate or configure a higher emergency level, compared to when the V2X UE detects a sound signal in the second or third direction. Further, when the V2X UE detects a sound signal in the first direction, the V2X UE may calculate or configure a higher emergency level, compared to when the V2X UE detects sound signals in the second and third directions.

Alternatively, the first V2X UE may calculate or configure the emergency level according to Equation 1 described above. As described with reference to FIG. 18, the first V2X UE may aggregate an excess intensity for each direction, which is the extent to which the peak value of the signal intensity of each sound signal exceeds a predetermined threshold. According to Equation 1, the first V2X UE may calculate the emergency level by adding the product of excess intensities aggregated for the second direction and excess intensities aggregated for the third direction to excess intensities aggregated for the first direction.

Next, the first V2X UE may transmit the first signal with a transmission interval determined based on the risk level. The first signal may include a V2X message containing information on the first V2X UE or correspond to a V2X message.

Specifically, the first V2X UE may be configured with multiple transmission modes with different transmission intervals as defined in Table 5. Referring to FIG. 24, the first V2X UE may compare the risk level with the first thresholds to determine a transmission mode corresponding to the risk level (hereinafter referred to as a first transmission mode) among the multiple transmission modes. In this case, the first V2X UE may determine the transmission interval of the first signal based on transmission and reception intervals configured for the first transmission mode. Alternatively, as described above, transmission parameters (e.g., transmission power, number of times that transmission is repeated, transmission resources, etc.) and the type of message included in the first signal may be preconfigured for each of the multiple transmission modes. In other words, the V2X UE may determine various configurations for transmitting the first signal, including the transmission interval based on the multiple transmission modes.

Alternatively, an application sleep timing, a display brightness level, a location measurement scheme, a black box operation mode (control of safety applications related to the black box, activation of emergency calls, etc.), or related parameters may be preconfigured for each of the multiple transmission modes as defined in Table 6. The first V2X UE may configure or control the application sleep timing, display brightness level, and location measurement scheme based on parameters configured for the first transmission mode. In this case, the location measurement scheme may include an IMU-based location measurement scheme, a GPS-based location measurement scheme, a DGPS-based location measurement scheme, an RTK-based location measurement scheme, and a location measurement scheme based on wireless communication.

Alternatively, the first transmission mode may be switched or modified to a second transmission mode based on the emergency level and/or Doppler level. The second transmission mode may have a shorter transmission and reception interval than the first transmission mode or have the shortest transmission and reception interval. Furthermore, the second transmission mode may have parameters preconfigured to provide the user of the V2X UE with enhanced safety compared to the first transmission mode, such as a shorter application sleep timing, a brighter display brightness level, and a more precise location measurement scheme.

Specifically, the first V2X UE may switch or modify the first transmission mode to the second transmission mode if the Doppler level exceeds the first threshold. Alternatively, if the emergency level exceeds the second threshold, the first V2X UE may switch or modify the first transmission mode to the second transmission mode. In other words, when the Doppler level and/or emergency level exceed predetermined thresholds, it may mean that there is a vehicle or device approaching the first V2X UE from a direction with a high risk of accidents. Thus, the first V2X UE may switch to the second transmission mode, which ensures the safety of the user more effectively. Alternatively, the first V2X UE may adjust or increase the risk level based on the Doppler level and emergency level, thereby switching the first transmission mode to the second transmission mode.

Alternatively, the first V2X UE may transmit the first signal, which includes the emergency level, risk level, Doppler level, and/or determined transmission mode. In this case, neighboring devices may easily assess the risk status of the first V2X UE based on the first signal. The neighboring devices may also determine the reception interval of the first signal based on the transmission mode to continuously monitor the first V2X UE.

Figure 27:
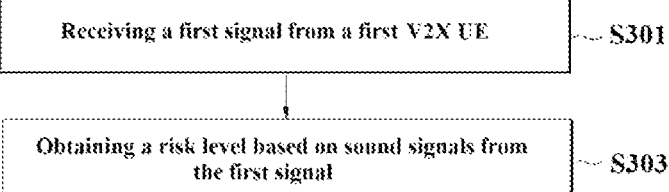
FIG. 27 is a diagram for explaining a method for a second VRU UE to receive a first signal.

FIG. 27 is a diagram for explaining a method for a second V2X UE to receive a first signal.

Referring to FIG. 27, the second V2X UE may receive the first signal from a first V2X UE (S301). The first signal may include information on the state of the first V2X UE or information on a hazardous situation.

Next, the second V2X UE may obtain a risk level for the first V2X UE based on the first signal. The first signal may include information about an emergency level, Doppler level, and/or determined transmission mode as well as the risk level as described with reference to FIG. 26.

In this case, the second V2X UE may easily assess the risk status of the first V2X UE based on information such as the risk level provided in the first signal. Additionally, the second V2X UE may determine the reception interval of the first signal based on information on the transmission mode included in the first signal and continuously monitor the first V2X UE effectively.

In summary, a V2X UE may calculate quantified risk levels based on surrounding sound signals by quickly and analytically assessing the proximity of surrounding vehicles based on the sound signals. In addition, the V2X UE may determine a signal transmission interval based on the risk level and transmit V2X safety messages with a transmission interval optimized for surrounding risk environments. The V2X UE may estimate the relative positions and directions of the surrounding sound signals to the V2X UE based on the difference in arrival times of the sound signals, calculate an emergency level, and adjust the transmission interval depending on the emergency level. Therefore, the V2X UE may effectively cope with risks based on the sound signals. Furthermore, the V2X UE may measure a Doppler frequency shift for each of the surrounding sound signal to calculate a Doppler level related to the proximity of neighboring devices. The V2X UE may effectively cope with risks based on the sound signals by further adjusting the transmission interval.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 28:
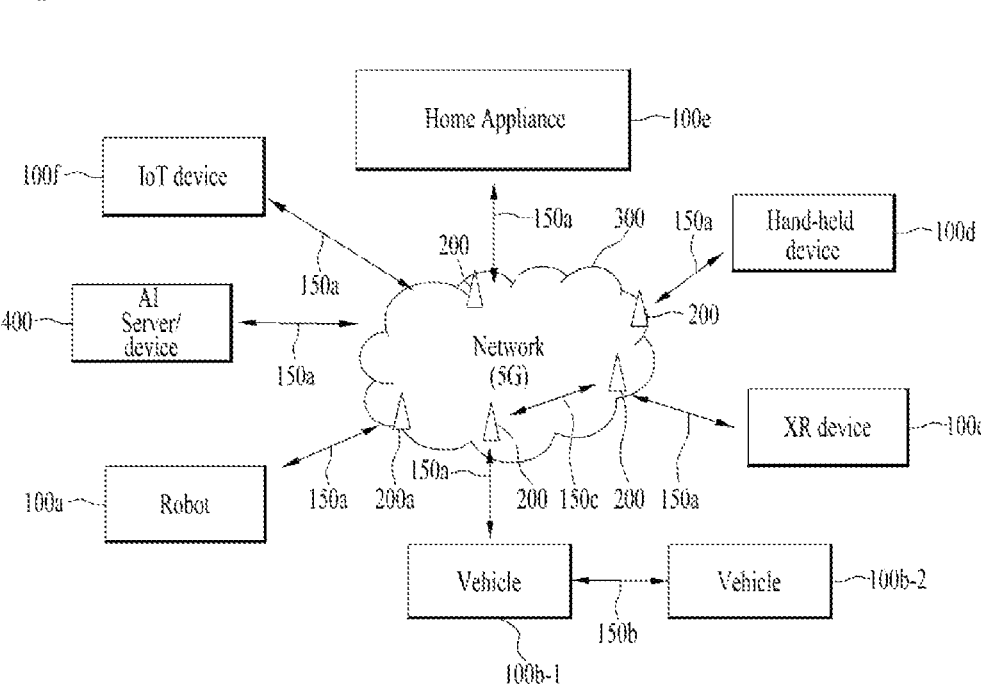
FIG. 28 illustrates a communication system applied to the present disclosure.

FIG. 28 illustrates a communication system applied to the present disclosure.

Referring to FIG. 28, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 29:
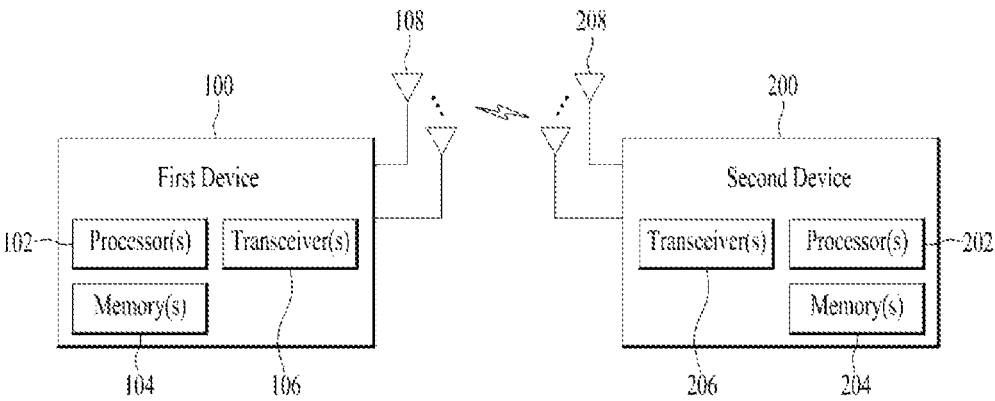
FIG. 29 illustrates wireless devices applicable to the present disclosure.

FIG. 29 illustrates a wireless device applicable to the present disclosure.

Referring to FIG. 29, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 28.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

According to an embodiment, the first wireless device 100 or a first V2X UE may include the processor(s) 102 connected to the transceiver(s) 106 or RF transceiver(s) and the memory(s) 104. The memory(s) 104 may include at least one program for performing operations related to the embodiments described above with reference to FIGS. 11 to 27.

Specifically, the processor(s) 102 may be configured to: control a sound input device (not shown) to receive second signals generated by neighboring devices; calculate a risk level based on signal intensities of sound signals; determine a transmission interval of a first signal based on the risk level; and control the transceiver(s) 106 to transmit the first signal based on the transmission interval.

Alternatively, a chipset including the processor(s) 102 and the memory(s) 104 may be configured. The chipset may include: at least one processor; and at least one memory operably connected to the at least one processor and configured to, when executed, cause the at least one processor to perform operations. The operations may include: receiving second signals generated by neighboring devices; calculating a risk level based on signal characteristics of sound signals; determining a transmission interval of a first signal based on the risk level; and transmitting the first signal based on the transmission interval through the RF transceiver. In addition, the at least one processor may perform operations related to the embodiments described with reference to FIGS. 11 to 27 based on a program included in the memory.

Alternatively, there is provided a computer-readable storage medium including at least one computer program configured to cause at least one processor to perform operations. The operations may include: receiving second signals generated by neighboring devices; calculating a risk level based on signal characteristics of sound signals; determining a transmission interval of a first signal based on the risk level; and transmitting the first signal based on the transmission interval through the RF transceiver. In addition, the computer program may include programs for performing operations related to the embodiments described in FIGS. 11 to 27.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

According to an embodiment, the second wireless device 200 or a second V2X UE may include the processor(s) 202 connected to the transceiver(s) 206 or RF transceiver(s) and the memory(s) 204. The memory(s) 204 may include at least one program for performing operations related to the embodiments described above with reference to FIGS. 11 to 27.

Specifically, according to an embodiment, the processor (s) 202 may be configured to: control the transceiver(s) 206 or RF transceiver to receive a first signal from a first V2X UE; obtain a risk level for the first V2X UE based on the first signal; and determine a reception interval of the first signal based on the risk level. The risk level may be calculated based on signal characteristics of sound signals.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flow-charts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio sig-nals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 30:
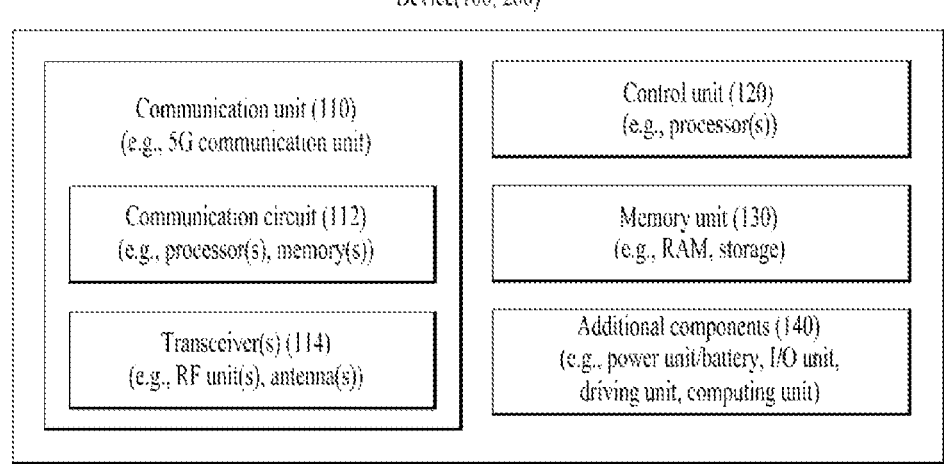
FIG. 30 illustrates another example of a wireless device to which the present disclosure is applied.

FIG. 30 illustrates another example of a wireless device applied to the present disclosure. The wireless device may be implemented in various forms according to a use-case/service (refer to FIG. 28)

Referring to FIG. 30, wireless devices 100 and 200 may correspond to the wireless devices 100 and 200 of FIG. 29 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114.

For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and controls overall operation of the wireless devices. For example, the control unit 120 may control an electric/mechanic al operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 28), the vehicles (100b-1 and 100b-2 of FIG. 28), the XR device (100c of FIG. 28), the hand-held device (100d of FIG. 28), the home appliance (100e of FIG. 28), the IoT device (100f of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, etc. The wireless device may be used in a mobile or fixed place according to a use-example/service.

In FIG. 30, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology and may be implemented in standards such as LTE Cat NB1 and/or LTE Cat NB2, and is not limited to the above-described names Additionally or alternatively, the wireless communication technology implemented in the wireless devices (XXX, YYY) of the present specification may perform communication based on LTE-M technology. In this case, as an example, the LTE-M technology may be an example of LPWAN technology and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names Additionally or alternatively, the wireless communication technology implemented in the wireless devices (XXX, YYY) of the present specification is at least one of ZigBee, Bluetooth, and Low Power Wide Area Network (LPWAN) considering low power communication and is not limited to the above-described names. As an example, ZigBee technology can generate personal area networks (PANs) related to small/low-power digital communication based on various standards such as IEEE 802.15.4 and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network including a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method of a first user equipment (UE) comprising:
collecting acoustic signals generated by neighboring devices using an acoustic sensor;
determining a transmission period of a first radio signal based on a risk level determined by an intensity of the acoustic signals; and
transmitting a first radio signal including status information of the first UE based on
the transmission period of the first radio signal.

2. The method of claim 1,
wherein the intensity of the acoustic signals is calculated based on second acoustic signals extracted from the acoustic signals within at least one predetermined frequency bandwidth,
wherein the first UE calculates a number of first acoustic signals determined to be blue-shifted among the acoustic signals based on the Doppler effect, and
wherein the transmission period of the first radio signal is determined based on the number of the first acoustic signals and the risk level.

3. The method of claim 1, wherein the transmission period is determined based on at least one transmission period configured for a first transmission mode related to the risk level among a plurality of transmission modes having different transmission and reception periods, and
wherein a message type of the first radio signal is determined based on a message type configured for the first transmission mode related to the risk level among the plurality of transmission modes.

4. The method of claim 3, wherein an application sleep timing, a display brightness level, a location measurement scheme, and a black box operation mode of the first UE are determined based on the first transmission mode.

5. The method of claim 3, wherein the first UE is further configured to:
measure a Doppler frequency shift for each of the acoustic signals; and
calculate an approach level based on the measured Doppler frequency shift, and
wherein based on that the approach level is more than or equal to a first predetermined threshold, the first transmission mode is switched to a second transmission mode having a shorter transmission period.

6. The method of claim 5, wherein the second transmission mode is a transmission mode having a shortest transmission and reception period among the plurality of transmission modes.

7. The method of claim 5, wherein detection of an acoustic signal having a positive Doppler frequency shift related to a blue shift increases the approach level compared to detection of an acoustic signal having a negative Doppler frequency shift related to a red shift.

8. The method of claim 3, wherein the first UE is further configured to:
predict an acoustic signal direction of each of the acoustic signals based on a difference between arrival times at which each acoustic signal arrives at two or more acoustic signal receivers spaced apart at a predetermined distance; and
calculate an emergency level based on the acoustic signal direction, and
wherein based on that the emergency level is more than or equal to a second predetermined threshold, the first transmission mode is switched to a second transmission mode having a shorter transmission period.

9. The method of claim 8, wherein the second transmission mode is a transmission mode having a shortest transmission and reception period among the plurality of transmission modes.

10. The method of claim 8, wherein the first UE is configured to predict directions of the acoustic signals among a first direction, a second direction, and a third direction, and
wherein detection of an acoustic signal predicted to be in the first direction corresponding to a traveling direction of the first UE increases the emergency level compared to detection of an acoustic signal predicted to be in the second or third direction.

11. The method of claim 10, wherein the first UE is configured to aggregate an excess intensity for each direction, where the excess intensity is an extent to which a peak value of a intensity of each of the acoustic signals exceeds a predetermined threshold, and
wherein the emergency level is calculated by adding a product of excess intensities aggregated for the second direction and excess intensities aggregated for the third direction to excess intensities aggregated for the first direction.

12. A method of a second user equipment (UE) comprising:
receiving a first radio signal including status information of a first UE from the first UE; and
obtaining a risk level for the first UE based on the status information,
wherein the second UE is configured to determine a reception period of the first radio signal based on the risk level, and
wherein the risk level is determined based on an intensity of acoustic signals collected by the first UE.

13. A first user equipment (UE) comprising:
a radio frequency (RF) transceiver;
an acoustic sensor; and
a processor connected to the RF transceiver and the acoustic sensor,
wherein the processor is configured to:
control the acoustic sensor to collect acoustic signals generated by neighboring devices;

determine a transmission period of a first radio signal based on a risk level determined by an intensity of the acoustic signals; and control the RF transceiver to transmit the first radio signal including status information of the first UE based on the transmission period of the first radio signal.

* * * * *